US012568402B2

(12) United States Patent
Shilov et al.

(10) Patent No.: US 12,568,402 B2
(45) Date of Patent: Mar. 3, 2026

(54) V2X QoS AND CONGESTION CONTROL FOR NEW RADIO (NR) SYSTEMS

(71) Applicant: Intel Corporation, Santa Clara, CA (US)

(72) Inventors: Mikhail Shilov, Santa Clara, CA (US); Alexey Khoryaev, Santa Clara, CA (US); Sergey Panteleev, Kildare (IE); Sergey Sosnin, Santa Clara, CA (US); Kilian Roth, Munich (DE)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 18/415,317

(22) Filed: Jan. 17, 2024

(65) Prior Publication Data

US 2024/0205738 A1     Jun. 20, 2024

Related U.S. Application Data

(63) Continuation of application No. 16/995,724, filed on Aug. 17, 2020, now Pat. No. 11,924,676.

(60) Provisional application No. 62/888,344, filed on Aug. 16, 2019.

(51) Int. Cl.
| | |
|---|---|
| *H04W 28/16* | (2009.01) |
| *H04W 4/40* | (2018.01) |
| *H04W 28/084* | (2023.01) |
| *H04W 72/20* | (2023.01) |
| *H04W 72/56* | (2023.01) |

(52) U.S. Cl.
CPC ........... *H04W 28/16* (2013.01); *H04W 72/20* (2023.01); *H04W 72/56* (2023.01); *H04W 4/40* (2018.02); *H04W 28/084* (2023.05)

(58) Field of Classification Search
CPC ..... H04W 28/16; H04W 72/20; H04W 72/56; H04W 4/40; H04W 28/084; H04W 72/02; H04W 28/0289; H04W 4/70
See application file for complete search history.

(56) References Cited

U.S. PATENT DOCUMENTS

| | | | |
|---|---|---|---|
| 2018/0206260 A1 | 7/2018 | Khoryaev et al. | |
| 2020/0413348 A1 | 12/2020 | Ryu et al. | |
| 2021/0022142 A1 | 1/2021 | Wu et al. | |
| 2023/0292344 A1* | 9/2023 | Hwang | ................. H04W 72/25 |

FOREIGN PATENT DOCUMENTS

| | | |
|---|---|---|
| WO | 2018/064131 A1 | 4/2018 |

OTHER PUBLICATIONS

United States Patent Office—Office Action mailed Sep. 26, 2022, from U.S. Appl. No. 16/995,724, 11 pages.
United States Patent Office—Final Office Action mailed Jun. 12, 2023, from U.S. Appl. No. 16/995,724, 24 pages.

* cited by examiner

*Primary Examiner* — Shawn D Miller
(74) *Attorney, Agent, or Firm* — Schwegman Lundberg & Woessner, P.A.

(57) ABSTRACT

Embodiments herein relate to sidelink communication between nodes. Aspects of the sidelink communication, in accordance with embodiments herein, may include one or more of resource selection, congestion control, and resource signaling. Specific embodiments may relate to use of at least one priority level during the sidelink communication. Other embodiments may be described and/or claimed.

20 Claims, 11 Drawing Sheets

V2X QoS AND CONGESTION CONTROL FOR NEW RADIO (NR) SYSTEMS

CROSS REFERENCE TO RELATED APPLICATION

The present application is a continuation of U.S. patent application Ser. No. 16/995,724, titled "V2X QOS AND CONGESTION CONTROL FOR NEW RADIO (NR) SYS-TEMS," which claims priority to U.S. Provisional Patent Application No. 62/888,344, titled "V2X QOS AND CON-GESTION CONTROL FOR NEW RADIO (NR) SYS-TEMS," which was filed Aug. 16, 2019, the disclosures of which are hereby incorporated by reference.

FIELD

Embodiments relate generally to the technical field of wireless communications.

BACKGROUND

Congestion control functionality has been already inte-grated into LTE sidelink communication. LTE specifies general congestion control framework and includes defini-tions of the used measurements, principles how to measure medium congestion, triggers for congestion control and manages transmitter channel occupancy.

LTE sidelink design was primarily designed with the periodic traffic in mind. To support periodic traffic, decisions specific to predictable nature of periodic traffic were made. For example, set of resources used to estimate transmitter channel occupancy may include future resources. Such behavior can be suitable for predictable traffic, but could be a problem for aperiodic traffic with randomized packet arrival timestamps.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
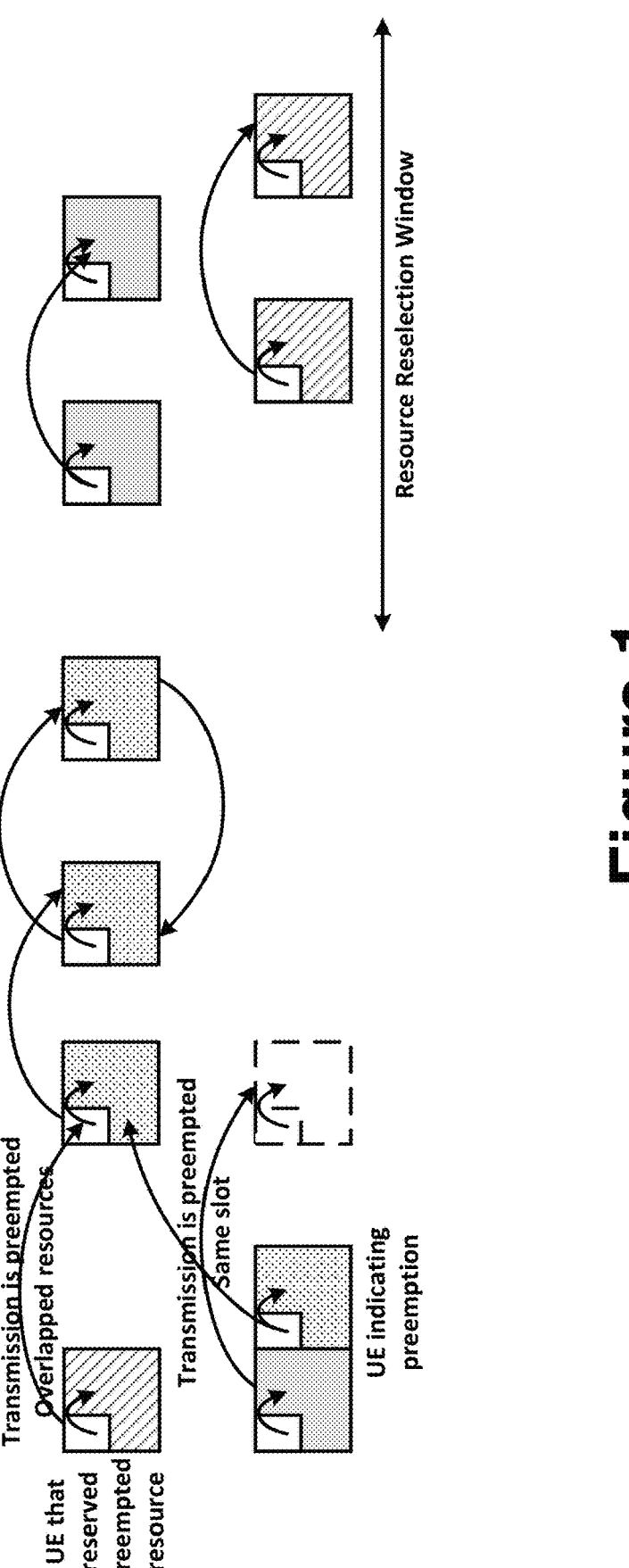
FIG. 1 schematically illustrates pre-emption principles in accordance with various embodiments.

The following detailed description refers to the accom-panying drawings. The same reference numbers may be used in different drawings to identify the same or similar ele-ments. In the following description, for purposes of expla-nation and not limitation, specific details are set forth such as particular structures, architectures, interfaces, techniques, etc, in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The NR sidelink communication is designed to efficiently deliver data to neighbor nodes. To improve communication performance, the sensing-based resource (re)-selection is currently under standardization process. However, sensing-based resource (re)selection could not cope with high medium congestion caused by, for example, high density of transmitting nodes or high traffic intensity. In this case, significant performance degradation at physical layer and, hence, significant service degradation will be observed.

In order to control performance degradation and manage channel access in fair manner across transmitters and ser-vices with different priorities, the congestion control frame-work has been developed.

The present disclosure provides embodiments for enhanced congestion control framework which supports medium congestion detection and channel loading manage-ment for arbitrary traffics types and used system numerolo-gies. In addition, the present disclosure includes preemption mechanisms to ensure favored radio-conditions for high priority transmissions Congestion control functionality has been already inte-grated into LTE sidelink communication. LTE specifies general congestion control framework and includes defini-tions of the used measurements, principles how to measure medium congestion, triggers for congestion control and manages transmitter channel occupancy.

LTE sidelink design was primarily designed with the periodic traffic in mind. To support periodic traffic, decisions specific to predictable nature of periodic traffic were made. For example, set of resources used to estimate transmitter channel occupancy may include future resources. Such behavior can be suitable for predictable traffic, but could be a problem for aperiodic traffic with randomized packet arrival timestamps.

In addition, LTE radio access technology was designed for a certain numerology. Therefore, parameters for congestion control were also selected based on single numerology assumption.

In contrast, to LTE, NR supports a set of numerologies and, therefore, congestion control parameters should be enhanced. The present documents provide these enhancements. The present disclosure provides the following congestion control embodiments:

1) Definition of the methodology to select resources for transmitter side channel occupancy ratio measurements and channel busy ratio measurements
2) Details of enhanced congestion control framework which supports management of the periodic and aperiodic traffics mixture
3) Details of congestion control and resource (re)selection frameworks details
4) Details of preemption mechanism The enhanced congestion control support both periodic and aperiodic traffics with a fair congestion management of periodic and aperiodic traffics.

The provision and support of the requested QoS is an important aspect of communication system design. There are different mechanisms at the physical layer which are responsible to provide certain QoS targets:

Resource management procedures. The resource management procedure includes resource (re)selection procedure, reserved resources signaling, etc. In order to minimize the collisions among UEs, the sensing-based resource selection is proposed for standardization in NR V2X WI. However, it is an open question how to manage resource allocations for the packets of different priorities.

Congestion control procedures. In case of medium congestion, the system experience significant performance degradation reflected in high packet losses and decreased performance of the sensing-based resource selection procedure that may lead to unstable behavior of the overall system. In order to reduce medium congestion, each node implements congestion control procedures that limit transmit node channel utilization depending on medium congestion level and transmitted traffic priority.

The present disclosure describes aspects of the resource signaling, resource selection, and congestion control mechanisms that allow to support requested QoS targets.

I. Sidelink Resource Reservation/Pre-Emption Design Details

There are several enhancements that could be implemented at the high priority UE Tx side and/or low priority UE Rx side that may be used to prioritize the delivery of the high priority packets at the physical layer.

I.1 High Priority TX Side Enhancements

I.1.1 Sidelink Resource Reservation/Pre-Emption

The SCI reservation mechanism may be (re)-used for the purpose of preemption indication by UEs with highest priority (e.g., UE transmitting data or control signaling may reserve spectrum resource for future use).

UE that indicates in SCI the highest sidelink transmission priority can be interpreted as preemption signaling. Alternatively, SCI payload may have a dedicated bit that serves as a trigger of pre-emption procedure for other UEs.

The same SCI can point to N additional resources reserved for future transmissions.

In case of preemption. UEs competing for resources but having lower sidelink transmission priority will yield resources reserved or selected for own transmissions and trigger resource reselection procedure if their resources overlap with preempted resources.

The time instances to trigger resource reselections may be randomized in a predefined time window. Start and duration of this window may depend on sidelink transmission priority. The resource reselection window may start right after the last reserved resource indicated by UE preempting resources plus T1, where T1 is a processing time for resource selection. In other embodiment, reselection window may overlap in time with the preemption process.

UEs that have lower priority and reserve or select non-collided resources in the same slot where preemption occurs are also expected to drop PSCCH/PSSCH transmissions on slots, even if there is no direct overlap detected. This will further improve reliability of high priority transmission given that half-duplex issue will be reduced as well as impact of in-band emissions can be minimized.

That is, UEs with lower priority that have detected transmission conflict with preempted resources are expected to release the transmission resource and trigger resource reselection with randomized in time trigger for resource selection (e.g UE specific backoffs in time).

FIG. 1 schematically illustrates pre-emption principles in accordance with various embodiments.

I.1.2 PSCCH Resources POWER BoostING

A UE that indicates in SCI the certain set of priorities (which are considered as high priorities) may apply power boosting at the PRBs allocated for PSCCH transmission in order to improve control information coverage and, therefore, reception probability.

In this case, the maximum number of PSCCH transmissions that may be boosted can be preconfigured by higher layers and may depends on priority. Alternatively, only first TTI of a given TB is scheduled with power boosted PSCCH transmission while other TTIs do not apply PSCCH power boosting.

PSCCH resources boosting value may be a preconfigured value (e.g., 0 or 3 or 6 dB) or may depend on priority assigned to transmission. In this case, the higher priority is assigned to transmission, the higher boosting value is used.

I.2 Low Priority UE RX Side Enhancements

UEs transmitting low priority data (low priority UE) perform the following actions:

Detect collision with high priority transmission from UE with high priority data (high priority UE)
Reselect overlapped resources
Indicate a new set of resources The potential options regarding how low priority UEs may treat the resource collision with high priority UE include Alternative 1 and Alternative 2 as discussed below.

Alternative 1: The collision is detected if low and high priority UEs transmissions overlap in both time and frequency dimensions. According to this approach, UE is allowed to select another frequency resource in the same time resource where high priority transmission occurs. In this case, low priority UE will transmit simultaneously with the high priority UE in different frequency resources. Despite the resource frequency orthogonalization, the following disadvantages of this approach should be highlighted:

In-band emission impact from low priority transmission to the high priority transmission due to in-band power leakage; and/or
Half-duplex impact onto transmitting low priority UE. The low priority UEs which transmits simultaneously with high priority UE could not receive the high priority data that decrease reception probability of high priority data.

In order to minimize impact on high priority data reception, low priority UE is allowed to perform frequency multiplexing with high priority transmission if one or multiple conditions from the list below are satisfied:

Low priority UE already receive high priority transmission;

RSRP measured at the resources occupied by high transmission UE is above certain preconfigured threshold; and/or Distance to the transmitting high priority UE is below certain preconfigured threshold.

Alternative 2: The collision is detected if low and high priority UEs overlap in time dimension. In this case low priority UEs select resources in slots different from the slots occupied by high priority transmissions. The main disadvantage of this collision detection approach is the significantly increased congestion at the time resources that are not occupied by high priority transmissions. In order to overcome the disadvantages, both alternatives may be used simultaneously. The usage of the described above alternatives may be:

Preconfigured by specification or higher layers for certain group of priorities.

Decided by low priority UE based on information about:

Absolute priority of high priority transmission.

Difference between priorities of low priority transmission and high priority transmission As a special case, the same procedure of preemption may be performed by a UE if it detects reservations from useful unicast or groupcast transmission, so that slots where useful reception should happen are excluded from resource selection, or reselected.

II. Congestion Control Design Details

II.1 Congestion Control Metrics

RAN1 agreed to support at least CBR (Channel Busy Ratio) metric. The definition and usage of congestion control metrics are still under discussion. The following discussion is related to metrics used by congestion control and congestion control implementation details.

II.1.1 Channel Occupancy Ratio (CR)

The LTE congestion control operation principle is based on limiting of the transmitting node channel utilization proportionally to the observed at the transmitting node medium congestion. At the RAN1 #96Bis meeting it was also agreed to use LTE Channel Busy Ratio metric. This metric characterizes observed by node medium loading. To characterize transmitter node channel occupancy in LTE V2X congestion control, the channel occupancy ratio parameter has been defined. To reuse basic principles of an LTE V2X functionality in NR V2X sidelink design, embodiments introduce channel occupancy ratio (CR) parameter, which is a measure of channel utilization by transmitting node and evaluated at the transmitter node itself.

The LTE V2X communication was primarily designed to support periodic traffic which future resource allocation may be predicted for a relatively long time after resource selection. Such specific resource allocation is also reflected in CR calculation methodology established in LTE. According to TS 36.214 specification CR parameter is evaluated over sub-channels allocated within a set of 1000 subframes which comprise CR calculation window. This window may be configured in a way that it may include resources for potential transmissions in future slots.

The aperiodic traffic targeted by NR V2X design could not be predicted and, hence, CR calculation window definition should also be modified for this traffic. In this case, CR calculation window should not include resources allocated in future.

In one embodiment, CR calculation window used for aperiodic traffic CR evaluation includes only resources in time preceding the moment of CR evaluation, w/o projection to future time instances.

Figure 2:
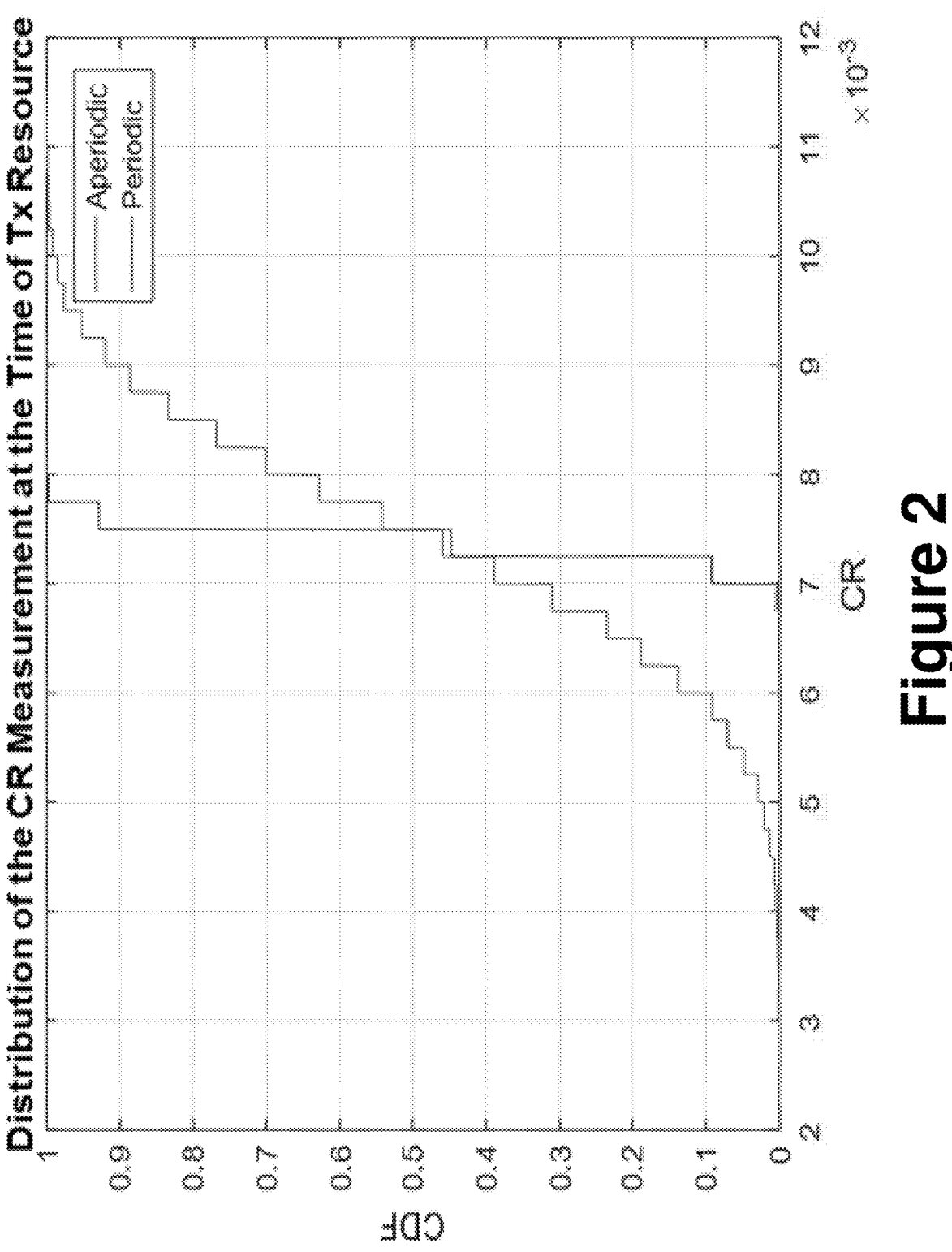
FIG. 2 illustrates a channel occupancy ratio (CR) param-eter for periodic and aperiodic traffic, in accordance with various embodiments.

Due to different nature of periodic and aperiodic traffic, the measured CR metric also has a different statistics. For periodic traffic the measured channel occupancy is almost the same at any estimation time moment, while for aperiodic traffic the estimated CR value has large variation even for 1s CR calculation window duration (see e.g., FIG. 2).

In case of traffic mixture, the CR metric may be calculated in different ways:

Alternative 1. Joint periodic and aperiodic traffic CR metric calculation.

Alternative 2. Separate CR metric calculation for periodic and aperiodic traffics.

According to the first alternative, the single CR metric is calculated. In this case, the metric should be compared with the single CRLimit value, which indicates the upper bound of the proportion of utilized resources. In case of mixture of traffics at the transmitter side, the bursty aperiodic traffic transmission may trigger congestion control for periodic traffic, which have constant in time resource utilization.

According to the second alternative, in an embodiment, separate CR metrics are evaluated for periodic and aperiodic traffic types, e.g., CRPeriodic and CRAperiodic. In this case, different resource occupancy management strategies may be used for periodic and aperiodic traffics. For example, for aperiodic traffic, the drop of transmission opportunity could be used to control channel utilization, while for periodic traffic it could be decided to limit the number of allocated TTIs to preserve transport block transmissions and simultaneously achieve target limit. Such behavior could be a more flexible and therefore preferred from our side.

In order to manage estimated CR metrics separately, the separate CR limit values ($CR_{Limit\_Periodic}$ and $CR_{Limit\_Aperiodic}$) should be calculated for periodic and aperiodic traffics. These values could be calculated from overall system $CR_{Limit}$ value using the knowledge of the amount of allocated resources (ARR) for each traffic in predefined window. One potential way to calculate the limits is:

$$CR_{Limit\_Periodic} + CR_{Limit\_Aperiodic} = CR_{Limit},$$

where $$CR_{Limit\_Periodic} / CR_{Limit\_Aperiodic} = ARR_{Periodic} / ARR_{Aperiodic}$$

The above parameters should be assessed for each priority level. The priority handling in congestion control may follow the same procedures as it was defined in LTE. In other words, if a UE is configured with high layer parameter cr-Limit and transmits PSSCH in slot n, the UE shall ensure the following limits for any priority value k:

$$\sum_{i \geq k} CR(i) \leq CR_{Limit}(k)$$

where CR(i) is the CR evaluated in slot n-$T_{proc}$ for the PSSCH transmissions with priority set to i, and $CR_{Limit}$ (k) corresponds to the high layer parameter cr-Limit that is associated with the priority value k and the CBR range which includes the CBR measured in slot n-$T_{proc}$. It is up to UE implementation how to meet the above limits, including dropping the transmissions in slot n.

II.1.2 CBR Metric

Similarly to the LTE, the CBR metric should be evaluated by each node over resources in a CBR measurement window. The problem of CBR measurement window definition incorporates the following aspects that should be considered in window size definition:

The minimum CBR adjustment value. The minimum CBR adjustment quanta could be calculated as $\Delta_{CBR}=1/$ ($CBR_{Window}*N_f$) assuming that only one resource change its state (from occupied to non-occupied or vice versa). The CBR window reduction lead to adjustment quanta increase that may result in less stable congestion control operation.

Sensitivity to the CBR variations. In case of aperiodic traffic transmission, the medium loading expected to become more diverse in time and space comparing with periodic traffic transmission. The reduction of CBR measurement window will further increase deviation in CBR measurements observed by each UE.

Sensitivity to the medium congestion rate/variation. CBR is used to monitor the change of medium congestion level which itself is a function of channel occupancy management performed by each UE. To enable prompt congestion level monitor, the selected CBR window length should not be too large.

Based on the discussions above, the specified in LTE 100 ms CBR window could be a good starting point for CBR window definition.

In contrast to the LTE V2X design which was developed for the single numerology, the novel NR V2X congestion control should support diverse set of numerologies where slot duration varies from 1 ms for 15 kHz SCS to 0.125 ms for 120 KHz SCS. At the same time, the number of frequency resources allocated in particular carrier reduces with subcarrier spacing increase. In order to keep the minimum CBR adjustment value in the same range, the number of resources within CBR measurement window should also be maintained the same. Therefore, in various embodiments, a CBR measurement window is configured according to numerology (e.g., scale).

At the previous meeting it was discussed, whether separate CBR measurements are needed for the PSFCH and PSCCH channels. In embodiments, CBR measurements at the PSFCH resources are not performed.

II.2 Joint Congestion Control and Resource Selection Operation Details

Resource selection procedure enables flexible resource selection and resource signaling, where resources may be continuously selected and signaled after initial resource (re)selection trigger. According to the proposed resource selection procedure, if resource was selected, but not indicated in any SCI, it could be further reselected. The medium congestion detected by congestion control may also trigger resource reselection instead of packet drop. In this case, transmitter is able to postpone its transmission in case of high medium loading while medium congestion will not decrease. In other words, when CBR is high the backoff of transmission is larger and if CBR is low the backoff of transmission is small. This can be implemented in practical system by either control of scheduling or resource selection window duration as a function of CBR or by controlling how many earliest in time resources are randomized to select resource for the first transmission.

In addition, the scheduling window size used in resource selection (see definition in Section III) may be a function of measured CBR. The larger the CBR (e.g., medium congestion), the larger the scheduling window size may be used.

III. Resource Selection Design Details to PROVISION QOS Targets

In order to provision QoS targets in a system where communication nodes originate packets with different priorities, enhancements to resource selection procedure are needed.

In order to have common understanding of resource selection procedure it is also important to introduce definition of the following time instances (see e.g., FIG. 3):

n—time instance of resource (re)-selection trigger $T_0$—offset toward time instance where sensing window starts (long-term sensing window duration)

$T_1$—resource (re)-selection processing delay $T_2$—offset toward time instance where sensing window ends for initial transmission ends $T_3$—offset to the first PSCCH/PSSCH transmission after time instance of resource (re)-selection trigger In order to describe resource selection procedure, embodiments introduce additional window in time called a scheduling window. The duration of scheduling window is determined by the maximum possible time gap between the first and last PSCCH/PSSCH resource indicated by a given SCI transmission and denoted by TSW.

Figure 3:
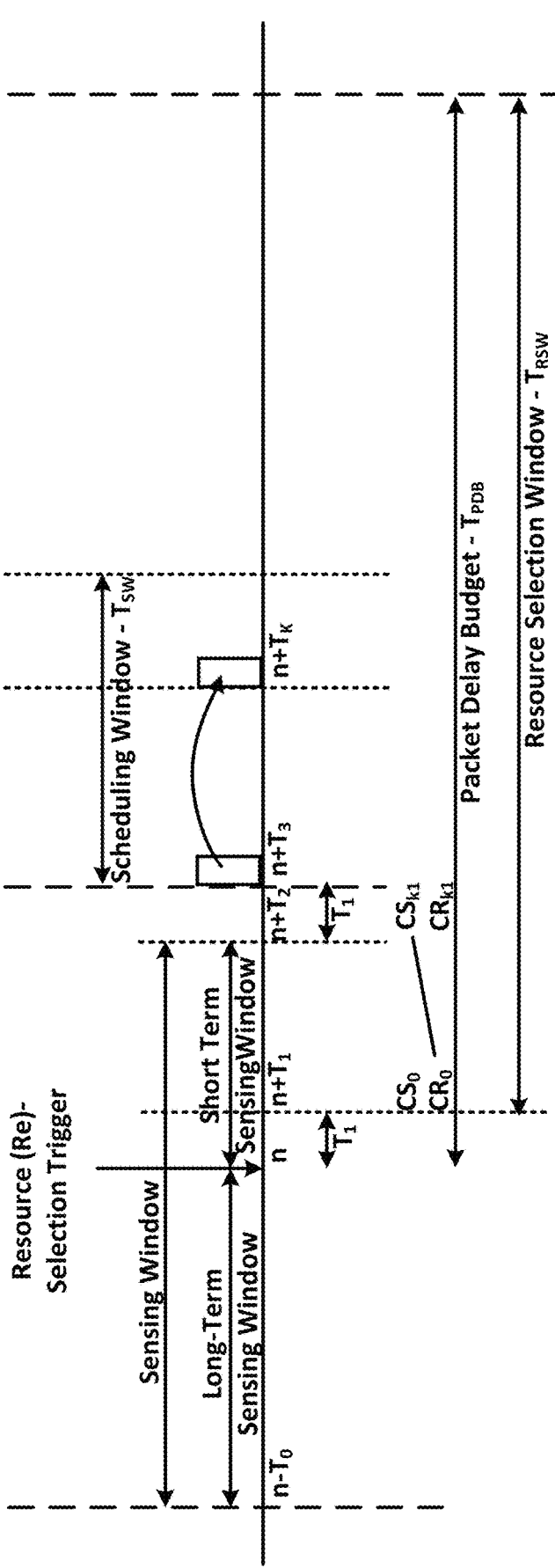
FIG. 3 illustrates timings for a resource selection proce-dure for the case of operation without HARQ process prolongation.

FIG. 3 illustrates timings for a resource selection procedure for the case of operation without HARQ process prolongation.

In order to fairly manage resource allocation for different priorities, an additional time component $T_{offset}$ may be added to the $T_1$ delay, e.g., $T_1'=T_1+T_{offset}$ (priority, latency), where additional time component $T_{offset}$ may depend on packet priority and latency requirement. For example, for low priority packets the large $T_{offset}$ may be selected, while for packets of highest priority zero value may be used.

Systems and Implementations

Figure 4:
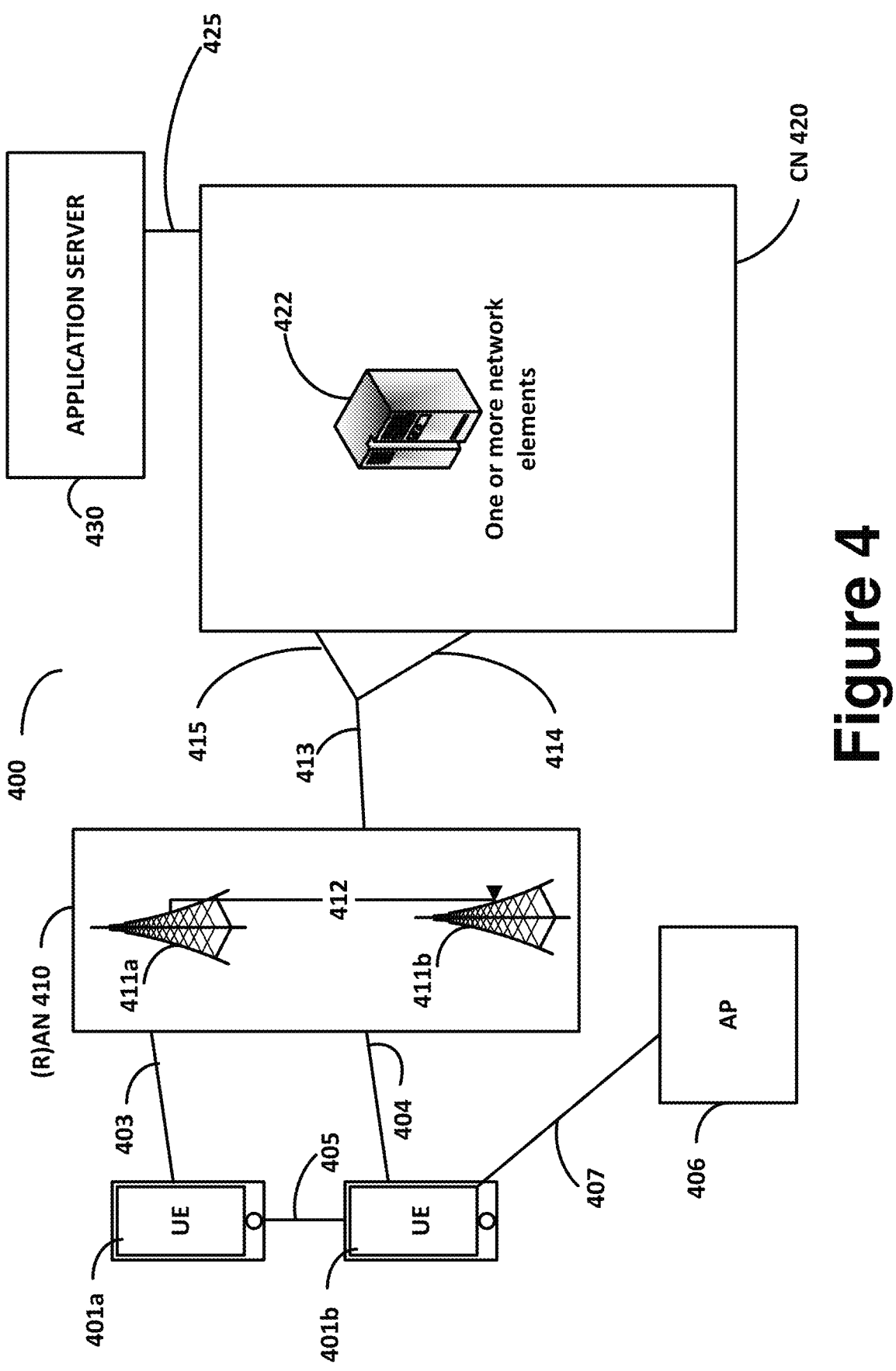
FIG. 4 illustrates an example architecture of a system of a network, in accordance with various embodiments.

FIG. 4 illustrates an example architecture of a system 400 of a network, in accordance with various embodiments. The following description is provided for an example system 400 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 4, the system 400 includes UE 401a and UE 401b (collectively referred to as "UEs 401" or "UE 401"). In this example, UEs 401 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices. M2M. IoT devices, and/or the like.

In some embodiments, any of the UEs 401 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some of these embodiments, the UEs 401 may be NB-IOT UEs 401. NB-IOT provides access to network services using physical layer optimized for very low power consumption (e.g., full carrier BW is 180 kHz, subcarrier spacing can be 3.75 kHz. or 15 kHz). A number of E-UTRA functions are not used for NB-IOT and need not be supported by RAN nodes 411 and UEs 401 only using NB-IOT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, self-configuration/self-optimization, among others. For NB-IOT operation, a UE 401 operates in the DL using 12 sub-carriers with a sub-carrier BW of 15 kHz, and in the UL using a single sub-carrier with a sub-carrier BW of either 3.75 kHz or 15 kHz or alternatively 3, 6 or 12 sub-carriers with a sub-carrier BW of 15 kHz.

In various embodiments, the UEs 401 may be MF UEs 401. MF UEs 401 are LTE-based UEs 401 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MulteFire is tightly aligned with 3GPP standards and builds on elements of the 3GPP specifications for LAA/eLAA, augmenting standard LTE to operate in global unlicensed spectrum. In some embodiments. LBT may be implemented to coexist with other unlicensed spectrum networks, such as WiFi, other LAA networks, or the like. In various embodiments, some or all UEs 401 may be NB-IOT UEs 401 that operate according to MF. In such embodiments, these UEs 401 may be referred to as "MF NB-IOT UEs 401." however, the term "NB-IOT UE 401" may refer to an "MF UE 401" or an "MF and NB-IOT UE 401" unless stated otherwise. Thus, the terms "NB-IOT UE 401," "MF UE 401," and "MF NB-IOT UE 401" may be used interchangeably throughout the present disclosure.

The UEs 401 may be configured to connect, for example, communicatively couple, with an or RAN 410. In embodiments, the RAN 410 may be an NG RAN or a 5G RAN, an E-UTRAN, an MF RAN, or a legacy RAN, such as a UTRAN or GERAN. As used herein, the term "NG RAN" or the like may refer to a RAN 410 that operates in an NR or 5G system 400, the term "E-UTRAN" or the like may refer to a RAN 410 that operates in an LTE or 4G system

400, and the term "MF RAN" or the like refers to a RAN 410 that operates in an MF system 100. The UEs 401 utilize connections (or channels) 403 and 404, respectively, each of which comprises a physical communications interface or layer (discussed in further detail below). The connections 103 and 104 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

In this example, the connections 403 and 404 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 401 may directly exchange communication data via a ProSe interface 405. The ProSe interface 405 may alternatively be referred to as a SL interface 405 and may comprise one or more physical and/or logical channels, including but not limited to the PSCCH, PSSCH, PSDCH, and PSBCH.

The UE 401b is shown to be configured to access an AP 406 (also referred to as "WLAN node 406." "WLAN 406." "WLAN Termination 406." "WT 406" or the like) via connection 407. The connection 407 can comprise a local wireless connection, such as a connection consistent with any IEEE 802.11 protocol, wherein the AP 406 would comprise a wireless fidelity (Wi-Fi®) router. In this example, the AP 406 is shown to be connected to the Internet without connecting to the core network of the wireless system (described in further detail below). In various embodiments, the UE 401b, RAN 410, and AP 406 may be configured to utilize LWA operation and/or LWIP operation. The LWA operation may involve the UE 401b in RRC_CONNECTED being configured by a RAN node 411a-b to utilize radio resources of LTE and WLAN. LWIP operation may involve the UE 401b using WLAN radio resources (e.g., connection 407) via IPsec protocol tunneling to authenticate and encrypt packets (e.g., IP packets) sent over the connection 407. IPsec tunneling may include encapsulating the entirety of original IP packets and adding a new packet header, thereby protecting the original header of the IP packets.

The RAN 410 can include one or more AN nodes or RAN nodes 411a and 411b (collectively referred to as "RAN nodes 411" or "RAN node 411") that enable the connections 403 and 404. As used herein, the terms "access node." "access point." or the like may describe equipment that provides the radio baseband functions for data and/or voice connectivity between a network and one or more users. These access nodes can be referred to as BS, gNBs, RAN nodes, cNBs, NodeBs, RSUs, MF-APs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 411 that operates in an NR or 5G system 400 (e.g., a gNB), and the term "E-UTRAN node" or the like may refer to a RAN node 411 that operates in an LTE or 4G system 400 (e.g., an eNB). According to various embodiments, the RAN nodes 411 may be implemented as one or more of a dedicated physical device such as a macrocell base station, and/or a low power (LP) base station for providing femtocells, picocells or other like cells having smaller coverage areas, smaller user capacity, or higher BW compared to macrocells.

In some embodiments, all or parts of the RAN nodes 411 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 411; a MAC/PHY split wherein RRC, PDCP, RLC, and MAC layers are operated by the CRAN/vBBUP and the PHY layer is operated by individual RAN nodes 411; or a "lower PHY" split wherein RRC, PDCP, RLC, MAC layers and upper portions of the PHY layer are operated by the CRAN/vBBUP and lower portions of the PHY layer are operated by individual RAN nodes 411. This virtualized framework allows the freed-up processor cores of the RAN nodes 411 to perform other virtualized applications. In some implementations, an individual RAN node 411 may represent individual gNB-DUs that are connected to a gNB-CU via individual F1 interfaces (not shown by FIG. 4). In these implementations, the gNB-DUs may include one or more remote radio heads or RFEMs (see e.g., FIG. 7), and the gNB-CU may be operated by a server that is located in the RAN 410 (not shown) or by a server pool in a similar manner as the CRAN/vBBUP. Additionally or alternatively, one or more of the RAN nodes 411 may be next generation eNBs (ng-eNBs), which are RAN nodes that provide E-UTRA user plane and control plane protocol terminations toward the UEs 401, and are connected to a 5GC (e.g., CN 620 of FIG. 6) via an NG interface (discussed infra). In MF implementations, the MF-APs 411 are entities that provide MulteFire radio services, and may be similar to eNBs 411 in an 3GPP architecture. Each MF-AP 411 includes or provides one or more MF cells.

In V2X scenarios one or more of the RAN nodes 411 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 401 (vUEs 401). The RSU may also include internal data storage circuitry to store intersection map geometry, traffic statistics, media, as well as applications/software to sense and control ongoing vehicular and pedestrian traffic. The RSU may operate on the 5.9 GHz. Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 411 can terminate the air interface protocol and can be the first point of contact for the UEs 401. In some embodiments, any of the RAN nodes 411 can fulfill various logical functions for the RAN 410 including, but not limited to, radio network controller (RNC) functions such as radio bearer management, uplink and downlink dynamic radio resource management and data packet scheduling, and mobility management.

In embodiments, the UEs 401 can be configured to communicate using OFDM communication signals with each other or with any of the RAN nodes 411 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In LTE implementations, a DL resource grid can be used for DL transmissions from any of the RAN nodes 411 to the UEs 401, while UL transmissions from the UEs 401 to RAN nodes 411 can utilize a suitable UL resource grid in a similar manner. These resource grids may refer to time-frequency grids, and indicate physical resource in the DL or UL in each slot. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. The duration of the resource grid in the time domain corresponds to one slot in a radio frame. The resource grids comprises a number of RBs, which describe the mapping of certain physical channels to REs. In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. RE (k,l) on antenna port p corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211.

In NR/5G implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with a half-frame 0 comprising subframes 0-4 and a half-frame 1 comprising subframes 5-9. There is one set of frames in the UL and one set of frames in the DL on a carrier. Uplink frame number i for transmission from the UE 401 starts $T_{TA}=(N_{TA}+N_{TA,offset})T_c$ before the start of the corresponding downlink frame at the UE where $N_{TA,offset}$ is given by 3GPP TS 38.213. For subcarrier spacing configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 3GPP TS 38.211. The start of slot $n_s^\mu$ in a subframe is aligned in time with the start of OFDM symbol $n_s^\mu N_{symb}^{slot}$ in the same subframe. OFDM symbols in a slot can be classified as 'downlink', 'flexible', or 'uplink', where downlink transmissions only occur in 'downlink' or 'flexible' symbols and the UEs 401 only transmit in 'uplink' or 'flexible' symbols.

For each numerology and carrier, a resource grid of $N_{grid,x}^{size,\mu}N_{sc}^{RB}$ subcarriers and $N_{symb}^{subframe,\mu}$ OFDM symbols is defined, starting at common RB $N_{grid}^{start,\mu}$ grid indicated by higher-layer signaling. There is one set of resource grids per transmission direction (e.g., uplink or downlink) with the subscript x set to DL for downlink and x set to UL for uplink. There is one resource grid for a given antenna port p, subcarrier spacing configuration $\mu$, and transmission direction (e.g., downlink or uplink).

An RB is defined as $N_{sc}^{RB}=12$ consecutive subcarriers in the frequency domain. Common RBs are numbered from 0 and upwards in the frequency domain for subcarrier spacing configuration $\mu$. The center of subcarrier 0 of common resource block 0 for subcarrier spacing configuration $\mu$ coincides with 'point A'. The relation between the common resource block number $n_{CRB}^\mu$ in the frequency domain and resource elements (k,l) for subcarrier spacing configuration $\mu$ is given by $$n_{CRB}^\mu = \left\lfloor \frac{k}{N_{sc}^{RB}} \right\rfloor$$

where k is defined relative to point A such that k=0 corresponds to the subcarrier centered around point A. Point A serves as a common reference point for resource block grids and is obtained from offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; and absoluteFrequencyPointA for all other cases where absoluteFrequencyPointA represents the frequency-location of point A expressed as in ARFCN.

A PRB for subcarrier configuration $\mu$ are defined within a BWP and numbered from 0 to $N_{BWP,i}^{size,\mu}-1$ where i is the number of the BWP. The relation between the physical resource block $n_{PRB}^\mu$ in BWPi and the common RB $n_{CRB}^\mu$ is given by $n_{CRB}^\mu=n_{PRB}^\mu+N_{BWP,i}^{start,\mu}$ where $N_{BWP,i}^{start,\mu}$ is the common RB where BWP starts relative to common RB 0. VRBs are defined within a BWP and numbered from 0 to $N_{BWP,i}^{size}-1$ where i is the number of the BWP.

Each element in the resource grid for antenna port p and subcarrier spacing configuration $\mu$ is called an RE and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 for a given numerology $\mu_i$ in BWP i on a given carrier. The starting position $N_{BWP,i}^{start,\mu}$ and the number of resource blocks $N_{BWP,i}^{size,\mu}$ in a BWP shall fulfil $N_{grid,x}^{start,\mu} \leq N_{BWP,i}^{start,\mu} \leq N_{grid,x}^{start,\mu}+N_{grid,x}^{size,\mu}$ and $N_{grid,x}^{start,\mu} < N_{BWP,i}^{start,\mu}+N_{BWP,i}^{size,\mu} \leq N_{grid,x}^{start,\mu}+N_{grid,x}^{size,\mu}$, respectively. Configuration of a BWP is described in clause 12 of 3GPP TS 38.213. The UEs 401 can be configured with up to four BWPs in the DL with a single DL BWP being active at a given time. The UEs 401 are not expected to receive PDSCH, PDCCH, or CSI-RS (except for RRM) outside an active BWP. The UEs 401 can be configured with up to four BWPs in the UL with a single UL BWP being active at a given time. If a UE 401 is configured with a supplementary UL, the UE 401 can be configured with up to four additional BWPs in the supplementary UL with a single supplementary UL BWP being active at a given time. The UEs 401 do not transmit PUSCH or PUCCH outside an active BWP, and for an active cell, the UEs do not transmit SRS outside an active BWP.

An NB is defined as six non-overlapping consecutive PRBs in the frequency domain. The total number of DL NBs in the DL transmission BW configured in the cell is given by $$N_{NB}^{DL} = \left\lfloor \frac{N_{RB}^{DL}}{6} \right\rfloor.$$

The NBs are numbered $n_{NB}=0, \ldots, N_{NB}^{DL}-1$ in order of increasing PRB number where narrowband $n_{NB}$ is comprises PRB indices:

$$\begin{cases} 6n_{NB}+i_0+i & \text{if } N_{RB}^{UL} \bmod 2 = 0 \\ 6n_{NB}+i_0+i & \text{if } N_{RB}^{UL} \bmod 2 = 1 \text{ and } n_{NB} < N_{NB}^{UL}/2, \\ 6n_{NB}+i_0+i+1 & \text{if } N_{RB}^{UL} \bmod 2 = 1 \text{ and } n_{NB} \geq N_{NB}^{UL}/2 \end{cases}$$

where $$i = 0, 1, \ldots, 5$$

$$i_0 = \left\lfloor \frac{N_{RB}^{UL}}{2} \right\rfloor - \frac{6N_{NB}^{UL}}{2}.$$

If $N_{NB}{}^{UL} \geq 4$, a wideband is defined as four non-overlapping narrowbands in the frequency domain. The total number of uplink widebands in the uplink transmission bandwidth configured in the cell is given by $$N_{WB}^{UL} = \left\lceil \frac{N_{NB}^{UL}}{4} \right\rceil$$

and the widebands are numbered $n_{WB}=0, \ldots, N_{WB}{}^{UL}-1$ in order of increasing narrowband number where wideband $n_{WB}$ is composed of narrowband indices $4n_{WB}+i$ where $i=0$, $1, \ldots, 3$. If $N_{NB}{}^{UL}<4$, then $N_{WB}{}^{UL}=1$ and the single wideband is composed of the $N_{NB}{}^{UL}$ non-overlapping narrowband(s).

There are several different physical channels and physical signals that are conveyed using RBs and/or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY 1010 of FIG. 10) but does not carry information originating from higher layers. Physical UL signals may include DMRS. PTRS. SRS, and/or any other physical UL signal(s) discussed herein, and physical DL signals may include DMRS. PTRS, CSI-RS. PSS. SSS, and/or any other physical DL signal(s) discussed herein.

The PDSCH carries user data and higher-layer signaling to the UEs 401. Typically. DL scheduling (assigning control and shared channel resource blocks to the UE 401 within a cell) may be performed at any of the RAN nodes 411 based on channel quality information fed back from any of the UEs 401. The downlink resource assignment information may be sent on the PDCCH used for (e.g., assigned to) each of the UEs 401. The PDCCH uses CCEs to convey control information (e.g., DCI), and a set of CCEs may be referred to as a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level. L=1, 2, 4, or 8 in LTE and L=1, 2, 4, 8, or 16 in NR). The UE 401 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212. DCI formats 0_0 through 2_3 as discussed in section 7.3 of 3GPP TS 38.212, or the like). The UEs 401 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change. UL power control commands for one cell and/or one RNTI, notification of a group of UEs 401 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

As alluded to previously, the PDCCH can be used to schedule DL transmissions on PDSCH and UL transmissions on PUSCH, wherein the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 401 of a slot format; notifying one or more UEs 401 of the PRB(s) and OFDM symbol(s) where a UE 401 may assume no transmission is intended for the UE; transmission of TPC commands for PUCCH and PUSCH; transmission of one or more TPC commands for SRS transmissions by one or more UEs 401; switching an active BWP for a UE 401; and initiating a random access procedure.

In NR implementations, the UEs 401 monitor (or attempt to decode) respective sets of PDCCH candidates in one or more configured monitoring occasions in one or more configured CORESETs according to the corresponding search space configurations. A CORESET may include a set of PRBs with a time duration of 1 to 3 OFDM symbols. A CORESET may additionally or alternatively include $N_{RB}{}^{CORESET}$ RBs in the frequency domain and $N_{symb}{}^{CORESET} \in \{1,2,3\}$ symbols in the time domain. A CORESET includes six REGs numbered in increasing order in a time-first manner, wherein an REG equals one RB during one OFDM symbol. The UEs 401 can be configured with multiple CORESETS where each CORESET is associated with one CCE-to-REG mapping only. Interleaved and non-interleaved CCE-to-REG mapping are supported in a CORESET. Each REG carrying a PDCCH carries its own DMRS.

According to various embodiments, the UEs 401 and the RAN nodes 411 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHZ to approximately 3.8 GHz, whereas the unlicensed spectrum may include the 5 GHz band.

To operate in the unlicensed spectrum, the UEs 401 and the RAN nodes 411 may operate using LAA, eLAA, and/or feLAA mechanisms. In these implementations, the UEs 401 and the RAN nodes 411 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 401 RAN nodes 411, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 401, AP 406, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the BWs of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 401 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The RAN nodes 411 may be configured to communicate with one another via interface 412. In embodiments where the system 400 is an LTE system (e.g., when CN 420 is an EPC 520 as in FIG. 5), the interface 412 may be an X2 interface 412. The X2 interface may be defined between two or more RAN nodes 411 (e.g., two or more eNBs and the like) that connect to EPC 420, and/or between two eNBs connecting to EPC 420. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 401 from an SeNB for user data; information of PDCP PDUs that were not delivered to a UE 401; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 100 is an MF system (e.g., when CN 420 is an NHCN 420), the interface 412 may be an X2 interface 412. The X2 interface may be defined between two or more RAN nodes 411 (e.g., two or more MF-APs and the like) that connect to NHCN 420, and/or between two MF-APs connecting to NHCN 420. In these embodiments, the X2 interface may operate in a same or similar manner as discussed previously.

In embodiments where the system 400 is a 5G or NR system (e.g., when CN 420 is an 5GC 620 as in FIG. 6), the interface 412 may be an Xn interface 412. The Xn interface is defined between two or more RAN nodes 411 (e.g., two or more gNBs and the like) that connect to 5GC 420, between a RAN node 411 (e.g., a gNB) connecting to 5GC 420 and an eNB, and/or between two eNBs connecting to 5GC 420. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 401 in a connected mode (e.g., CM-CONNECTED) including functionality to manage the UE mobility for connected mode between one or more RAN nodes 411. The mobility support may include context transfer from an old (source) serving RAN node 411 to new (target) serving RAN node 411; and control of user plane tunnels between old (source) serving RAN node 411 to new (target) serving RAN node 411. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 410 is shown to be communicatively coupled to a core network—in this embodiment, CN 420. The CN 420 may comprise a plurality of network elements 422, which are configured to offer various data and telecommunications services to customers/subscribers (e.g., users of UEs 401) who are connected to the CN 420 via the RAN 410. The components of the CN 420 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 420 may be referred to as a network slice, and a logical instantiation of a portion of the CN 420 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 430 may be an element offering applications that use IP bearer resources with the core network (e.g., UMTS PS domain, LTE PS data services, etc.). The application server 430 can also be configured to support one or more communication services (e.g., VOIP sessions, PTT sessions, group communication sessions, social networking services, etc.) for the UEs 401 via the EPC 420.

In embodiments, the CN 420 may be a 5GC (referred to as "5GC 420" or the like), and the RAN 410 may be connected with the CN 420 via an NG interface 413. In embodiments, the NG interface 413 may be split into two parts, an NG user plane (NG-U) interface 414, which carries traffic data between the RAN nodes 411 and a UPF, and the S1 control plane (NG-C) interface 415, which is a signaling interface between the RAN nodes 411 and AMFs. Embodiments where the CN 420 is a 5GC 420 are discussed in more detail with regard to FIG. 6.

In embodiments, the CN 420 may be a 5G CN (referred to as "5GC 420" or the like), while in other embodiments, the CN 420 may be an EPC). Where CN 420 is an EPC (referred to as "EPC 420" or the like), the RAN 410 may be connected with the CN 420 via an S1 interface 413. In embodiments, the S1 interface 413 may be split into two parts, an S1 user plane (S1-U) interface 414, which carries traffic data between the RAN nodes 411 and the S-GW, and the S1-MME interface 415, which is a signaling interface between the RAN nodes 411 and MMEs.

In embodiments where the CN 420 is an MF NHCN 420, the one or more network elements 422 may include or operate one or more NH-MMEs, local AAA proxies, NH- GWs, and/or other like MF NHCN elements. The NH-MME provides similar functionality as an MME in EPC 420. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined S-GW/P-GW for non-EPC routed PDN connections. For EPC Routed PDN connections, the NHN-GW provides similar functionality as the S-GW discussed previously in interactions with the MF-APs over the S1 interface 413 and is similar to the TWAG in interactions with the PLMN PDN-GWs over the S2a interface. In some embodiments, the MF APs 411 may connect with the EPC 420 discussed previously. Additionally, the RAN 410 (referred to as an "MF RAN 410" or the like) may be connected with the NHCN 420 via an S1 interface 413. In these embodiments, the S1 interface 413 may be split into two parts, the S1-U interface 414 that carries traffic data between the RAN nodes 411 (e.g., the "MF-APs 411") and the NH-GW, and the S1-MME-N interface 415, which is a signaling interface between the RAN nodes 411 and NH-MMEs. The S1-U interface 414 and the S1-MME-N interface 415 have the same or similar functionality as the S1-U interface 414 and the S1-MME interface 415 of the EPC 420 discussed herein.

Figure 5:
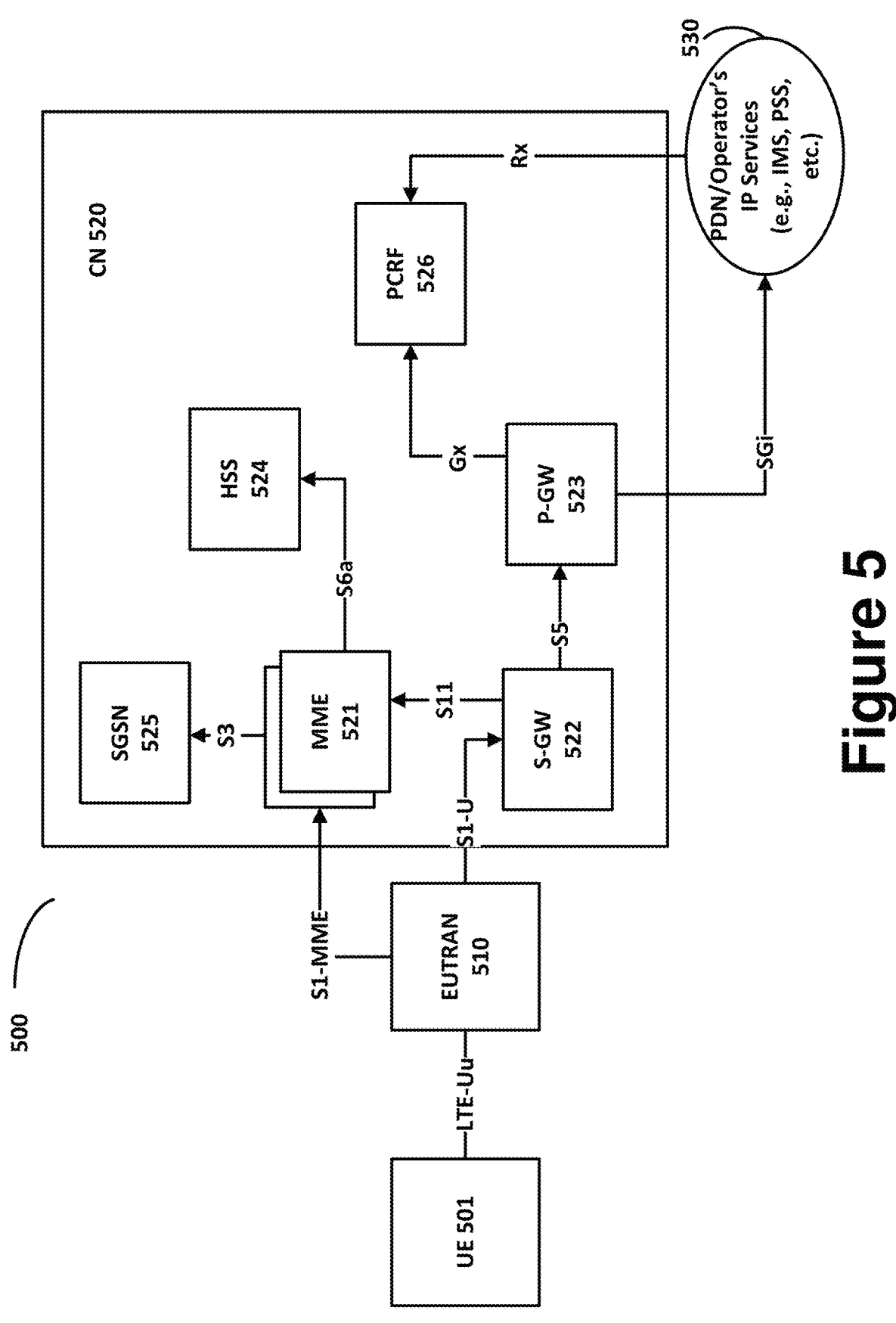
FIG. 5 illustrates an example architecture of a system including a first CN, in accordance with various embodi-ments.

FIG. 5 illustrates an example architecture of a system 500 including a first CN 520, in accordance with various embodiments. In this example, system 500 may implement the LTE standard wherein the CN 520 is an EPC 520 that corresponds with CN 420 of FIG. 4. Additionally, the UE 501 may be the same or similar as the UEs 401 of FIG. 4, and the E-UTRAN 510 may be a RAN that is the same or similar to the RAN 410 of FIG. 4, and which may include RAN nodes 411 discussed previously. The CN 520 may comprise MMEs 521, an S-GW 522, a P-GW 523, a HSS 524, and a SGSN 525.

The MMEs 521 may be similar in function to the control plane of legacy SGSN, and may implement MM functions to keep track of the current location of a UE 501. The MMEs 521 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 501, provide user identity confidentiality, and/or perform other like services to users/subscribers. Each UE 501 and the MME 521 may include an MM or EMM sublayer, and an MM context may be established in the UE 501 and the MME 521 when an attach procedure is successfully completed. The MM context may be a data structure or database object that stores MM-related information of the UE 501. The MMEs 521 may be coupled with the HSS 524 via an S6a reference point, coupled with the SGSN 525 via an S3 reference point, and coupled with the S-GW 522 via an S11 reference point.

The SGSN 525 may be a node that serves the UE 501 by tracking the location of an individual UE 501 and performing security functions. In addition, the SGSN 525 may perform Inter-EPC node signaling for mobility between 2G/3G and E-UTRAN 3GPP access networks; PDN and S-GW selection as specified by the MMEs 521; handling of UE 501 time zone functions as specified by the MMEs 521; and MME selection for handovers to E-UTRAN 3GPP access network. The S3 reference point between the MMEs 521 and the SGSN 525 may enable user and bearer information exchange for inter-3GPP access network mobility in idle and/or active states.

The HSS 524 may comprise a database for network users, including subscription-related information to support the network entities' handling of communication sessions. The EPC 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc. An S6a reference point between the HSS 524 and the MMEs 521 may enable transfer of subscription and authentication data for authenticating/authorizing user access to the EPC 520 between HSS 524 and the MMEs 521.

The S-GW 522 may terminate the S1 interface 413 ("S1-U" in FIG. 5) toward the RAN 510, and routes data packets between the RAN 510 and the EPC 520. In addition, the S-GW 522 may be a local mobility anchor point for inter-RAN node handovers and also may provide an anchor for inter-3GPP mobility. Other responsibilities may include lawful intercept, charging, and some policy enforcement. The S11 reference point between the S-GW 522 and the MMEs 521 may provide a control plane between the MMEs 521 and the S-GW 522. The S-GW 522 may be coupled with the P-GW 523 via an S5 reference point.

The P-GW 523 may terminate an SGi interface toward a PDN 530. The P-GW 523 may route data packets between the EPC 520 and external networks such as a network including the application server 430 (alternatively referred to as an "AF") via an IP interface 425 (see e.g., FIG. 4). In embodiments, the P-GW 523 may be communicatively coupled to an application server (application server 430 of FIG. 4 or PDN 530 in FIG. 5) via an IP communications interface 425 (see, e.g., FIG. 4). The S5 reference point between the P-GW 523 and the S-GW 522 may provide user plane tunneling and tunnel management between the P-GW 523 and the S-GW 522. The S5 reference point may also be used for S-GW 522 relocation due to UE 501 mobility and if the S-GW 522 needs to connect to a non-collocated P-GW 523 for the required PDN connectivity. The P-GW 523 may further include a node for policy enforcement and charging data collection (e.g., PCEF (not shown)). Additionally, the SGi reference point between the P-GW 523 and the packet data network (PDN) 530 may be an operator external public, a private PDN, or an intra operator packet data network, for example, for provision of IMS services. The P-GW 523 may be coupled with a PCRF 526 via a Gx reference point.

PCRF 526 is the policy and charging control element of the EPC 520. In a non-roaming scenario, there may be a single PCRF 526 in the Home Public Land Mobile Network (HPLMN) associated with a UE 501's Internet Protocol Connectivity Access Network (IP-CAN) session. In a roaming scenario with local breakout of traffic, there may be two PCRFs associated with a UE 501's IP-CAN session, a Home PCRF (H-PCRF) within an HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate QoS and charging parameters. The PCRF 526 may provision this rule into a PCEF (not shown) with the appropriate TFT and QCI, which commences the QoS and charging as specified by the application server 530. The Gx reference point between the PCRF 526 and the P-GW 523 may allow for the transfer of QoS policy and charging rules from the PCRF 526 to PCEF in the P-GW 523. An Rx reference point may reside between the PDN 530 (or "AF 530") and the PCRF 526.

Figure 6:
FIG. 6 illustrates an architecture of a system 600 includ-ing a second CN 620 in accordance with various embodi-ments.
Figure 6:

FIG. 6 illustrates an architecture of a system 600 including a second CN 620 in accordance with various embodiments. The system 600 is shown to include a UE 601, which may be the same or similar to the UEs 401 and UE 501 discussed previously; a (R)AN 610, which may be the same or similar to the RAN 410 and RAN 510 discussed previously, and which may include RAN nodes 411 discussed previously; and a DN 603, which may be, for example, operator services, Internet access or 3rd party services; and a 5GC 620. The 5GC 620 may include an AUSF 622; an AMF 621; a SMF 624; a NEF 623; a PCF 626; a NRF 625; a UDM 627; an AF 628; a UPF 602; and a NSSF 629.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 602 may include an uplink classifier to support routing traffic flows to a data network. The DN 603 may represent various network operator services, Internet access, or third party services. DN 603 may include, or be similar to, application server 430 discussed previously. The UPF 602 may interact with the SMF 624 via an N4 reference point between the SMF 624 and the UPF 602.

The AUSF 622 may store data for authentication of UE 601 and handle authentication-related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 may be responsible for registration management (e.g., for registering UE 601, etc.), connection management, reachability management, mobility management, and lawful interception of AMF-related events, and access authentication and authorization. The AMF 621 may be a termination point for the an N11 reference point between the AMF 621 and the SMF 624. The AMF 621 may provide transport for SM messages between the UE 601 and the SMF 624, and act as a transparent proxy for routing SM messages. AMF 621 may also provide transport for SMS messages between UE 601 and an SMSF (not shown by FIG. 6). AMF 621 may act as SEAF, which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a SCM function, which receives a key from the SEA that it uses to derive access-network specific keys. Furthermore, AMF 621 may be a termination point of a RAN CP interface, which may include or be an N2 reference point between the (R)AN 610 and the AMF 621; and the AMF 621 may be a termination point of NAS (N1) signalling, and perform NAS ciphering and integrity protection.

AMF 621 may also support NAS signalling with a UE 601 over an N3 IWF interface. The N3IWF may be used to provide access to untrusted entities. N3IWF may be a termination point for the N2 interface between the (R)AN 610 and the AMF 621 for the control plane, and may be a termination point for the N3 reference point between the (R)AN 610 and the UPF 602 for the user plane. As such, the AMF 621 may handle N2 signalling from the SMF 624 and the AMF 621 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 621 and an N17 reference point between the AMF 621 and a 5G-EIR (not shown by FIG. 6).

The UE 601 may need to register with the AMF 621 in order to receive network services. RM is used to register or deregister the UE 601 with the network (e.g., AMF 621), and establish a UE context in the network (e.g., AMF 621). The UE 601 may operate in an RM-REGISTERED state or an RM-DEREGISTERED state. In the RM-DEREGISTERED state, the UE 601 is not registered with the network, and the UE context in AMF 621 holds no valid location or routing information for the UE 601 so the UE 601 is not reachable by the AMF 621. In the RM-REGISTERED state, the UE 601 is registered with the network, and the UE context in AMF 621 may hold a valid location or routing information for the UE 601 so the UE 601 is reachable by the AMF 621. In the RM-REGISTERED state, the UE 601 may perform mobility Registration Update procedures, perform periodic Registration Update procedures triggered by expiration of the periodic update timer (e.g., to notify the network that the UE 601 is still active), and perform a Registration Update procedure to update UE capability information or to re-negotiate protocol parameters with the network, among others.

The AMF 621 may store one or more RM contexts for the UE 601, where each RM context is associated with a specific access to the network. The RM context may be a data structure, database object, etc. that indicates or stores, inter alia, a registration state per access type and the periodic update timer. The AMF 621 may also store a 5GC MM context that may be the same or similar to the (E)MM context discussed previously. In various embodiments, the AMF 621 may store a CE mode B Restriction parameter of the UE 601 in an associated MM context or RM context. The AMF 621 may also derive the value, when needed, from the UE's usage setting parameter already stored in the UE context (and/or MM/RM context).

CM may be used to establish and release a signaling connection between the UE 601 and the AMF 621 over the N1 interface. The signaling connection is used to enable NAS signaling exchange between the UE 601 and the CN 620, and comprises both the signaling connection between the UE and the AN (e.g., RRC connection or UE-N3IWF connection for non-3GPP access) and the N2 connection for the UE 601 between the AN (e.g., RAN 610) and the AMF 621. The UE 601 may operate in one of two CM states. CM-IDLE mode or CM-CONNECTED mode. When the UE 601 is operating in the CM-IDLE state/mode, the UE 601 may have no NAS signaling connection established with the AMF 621 over the N1 interface, and there may be (R)AN 610 signaling connection (e.g., N2 and/or N3 connections) for the UE 601. When the UE 601 is operating in the CM-CONNECTED state/mode, the UE 601 may have an established NAS signaling connection with the AMF 621 over the N1 interface, and there may be a (R)AN 610 signaling connection (e.g., N2 and/or N3 connections) for the UE 601. Establishment of an N2 connection between the (R)AN 610 and the AMF 621 may cause the UE 601 to transition from CM-IDLE mode to CM-CONNECTED mode, and the UE 601 may transition from the CM-CON-NECTED mode to the CM-IDLE mode when N2 signaling between the (R)AN 610 and the AMF 621 is released.

The SMF 624 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 601 and a data network (DN) 603 identified by a Data Network Name (DNN). PDU sessions may be established upon UE 601 request, modified upon UE 601 and 5GC 620 request, and released upon UE 601 and 5GC 620 request using NAS SM signaling exchanged over the N1 reference point between the UE 601 and the SMF 624. Upon request from an application server, the 5GC 620 may trigger a specific application in the UE 601. In response to receipt of the trigger message, the UE 601 may pass the trigger message (or relevant parts/information of the trigger message) to one or more identified applications in the UE 601. The identified application(s) in the UE 601 may establish a PDU session to a specific DNN. The SMF 624 may check whether the UE 601 requests are compliant with user subscription information associated with the UE 601. In this regard, the SMF 624 may retrieve and/or request to receive update notifications on SMF 624 level subscription data from the UDM 627.

The SMF 624 may include the following roaming functionality: handling local enforcement to apply QOS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 624 may be included in the system 600, which may be between another SMF 624 in a visited network and the SMF 624 in the home network in roaming scenarios. Additionally, the SMF 624 may exhibit the Nsmf service-based interface.

The NEF 623 may provide means for securely exposing the services and capabilities provided by 3GPP network functions for third party, internal exposure/re-exposure. Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using standardized interfaces. The stored information can then be re-exposed by the NEF 623 to other NFs and AFs, and/or used for other purposes such as analytics. Additionally, the NEF 623 may exhibit an Nnef service-based interface.

The NRF 625 may support service discovery functions, receive NF discovery requests from NF instances, and provide the information of the discovered NF instances to the NF instances. NRF 625 also maintains information of available NF instances and their supported services. As used herein, the terms "instantiate." "instantiation," and the like may refer to the creation of an instance, and an "instance" may refer to a concrete occurrence of an object, which may occur, for example, during execution of program code. Additionally, the NRF 625 may exhibit the Nnrf service-based interface.

The PCF 626 may provide policy rules to control plane function(s) to enforce them, and may also support unified policy framework to govern network behaviour. The PCF 626 may also implement an FE to access subscription information relevant for policy decisions in a UDR of the UDM 627. The PCF 626 may communicate with the AMF 621 via an N15 reference point between the PCF 626 and the AMF 621, which may include a PCF 626 in a visited network and the AMF 621 in case of roaming scenarios. The PCF 626 may communicate with the AF 628 via an N5 reference point between the PCF 626 and the AF 628; and with the SMF 624 via an N7 reference point between the PCF 626 and the SMF 624. The system 600 and/or CN 620 may also include an N24 reference point between the PCF 626 (in the home network) and a PCF 626 in a visited network. Additionally, the PCF 626 may exhibit an Npcf service-based interface.

The UDM 627 may handle subscription-related information to support the network entities' handling of communication sessions, and may store subscription data of UE 601. For example, subscription data may be communicated between the UDM 627 and the AMF 621 via an N8 reference point between the UDM 627 and the AMF. The UDM 627 may include two parts, an application FE and a UDR (the FE and UDR are not shown by FIG. 6). The UDR may store subscription data and policy data for the UDM 627 and the PCF 626, and/or structured data for exposure and application data (including PFDs for application detection, application request information for multiple UEs 601) for the NEF 623. The Nudr service-based interface may be exhibited by the UDR 221 to allow the UDM 627, PCF 626, and NEF 623 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 624 via an N10 reference point between the UDM 627 and the SMF 624. UDM 627 may also support SMS management, wherein an SMS-FE implements the similar application logic as discussed previously. Additionally, the UDM 627 may exhibit the Nudm service-based interface.

The AF 628 may provide application influence on traffic routing, provide access to the NCE, and interact with the policy framework for policy control. The NCE may be a mechanism that allows the 5GC 620 and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data. UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs. Additionally, the AF 628 may exhibit an Naf service-based interface.

The NSSF 629 may select a set of network slice instances serving the UE 601. The NSSF 629 may also determine allowed NSSAI and the mapping to the subscribed S-NS-SAIs, if needed. The NSSF 629 may also determine the AMF set to be used to serve the UE 601, or a list of candidate AMF(s) 621 based on a suitable configuration and possibly by querying the NRF 625. The selection of a set of network slice instances for the UE 601 may be triggered by the AMF 621 with which the UE 601 is registered by interacting with the NSSF 629, which may lead to a change of AMF 621. The NSSF 629 may interact with the AMF 621 via an N22 reference point between AMF 621 and NSSF 629; and may communicate with another NSSF 629 in a visited network via an N31 reference point (not shown by FIG. 6). Additionally, the NSSF 629 may exhibit an Nnssf service-based interface.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for a notification procedure that the UE 601 is available for SMS transfer (e.g., set a UE not reachable flag, and notifying UDM 627 when UE 601 is available for SMS).

The CN 420 may also include other elements that are not shown by FIG. 6, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 6). Individual NFs may share a UDSF for storing their respective unstructured data or individual NFs may each have their own UDSF located at or near the individual NFs. Additionally, the UDSF may exhibit an Nudsf service-based interface (not shown by FIG. 6). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 6 for clarity. In one example, the CN 620 may include an Nx interface, which is an inter-CN interface between the MME (e.g., MME 521) and the AMF 621 in order to enable interworking between CN 620 and CN 520. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 7:
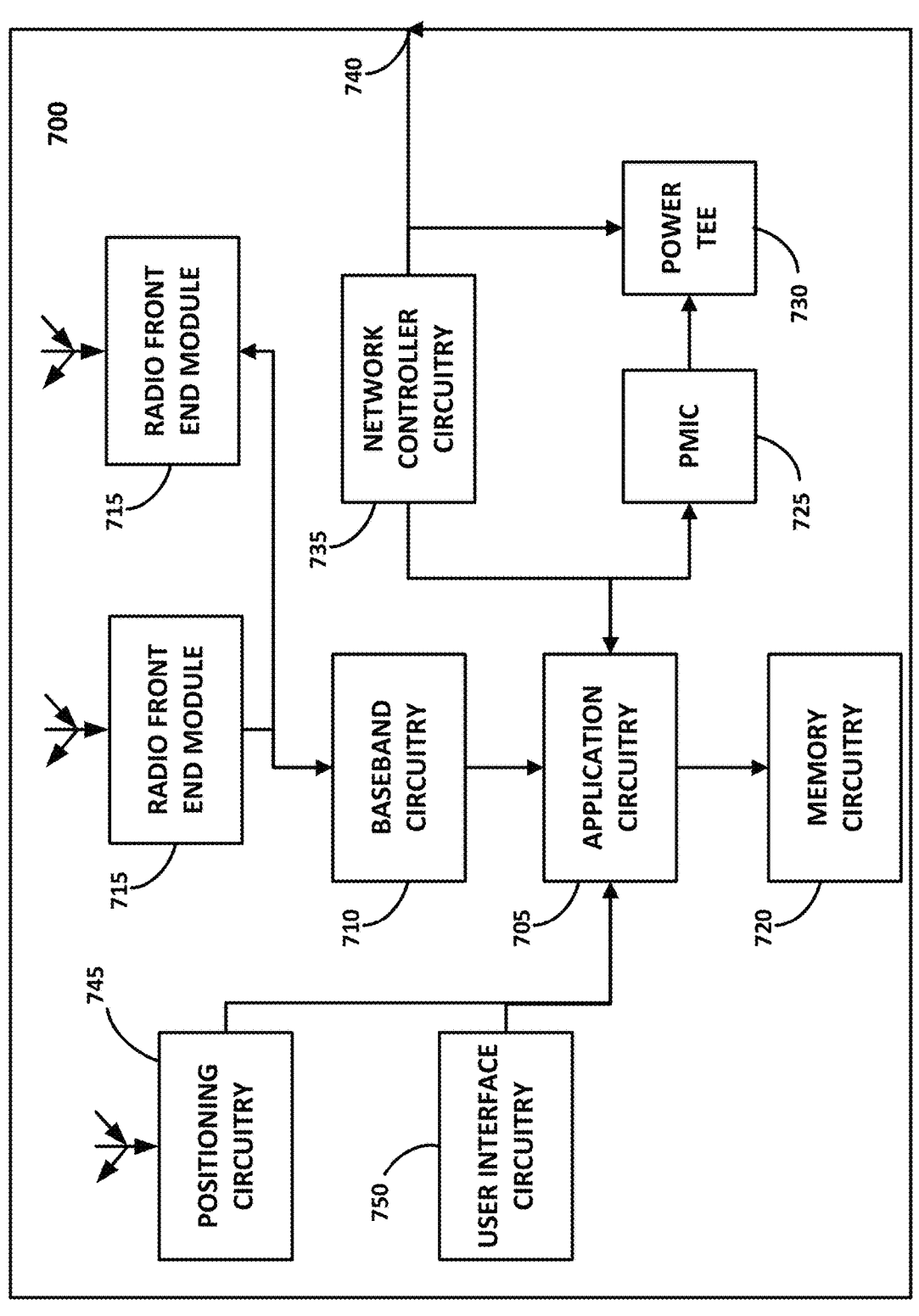
FIG. 7 illustrates an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node such as the RAN nodes 411 and/or AP 406 shown and described previously, application server(s) 430, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc, in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to Figure XT.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touch-screen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mm Wave RFICs may be physically separated from the mmWave RFEM. The RFICs may include connections to one or more antennas or antenna arrays (see e.g., antenna array 911 of Figure XT infra), and the RFEM may be connected to multiple antennas. In alternative implementations, both mmWave and sub-mm Wave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 411, etc.), or the like.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 8:
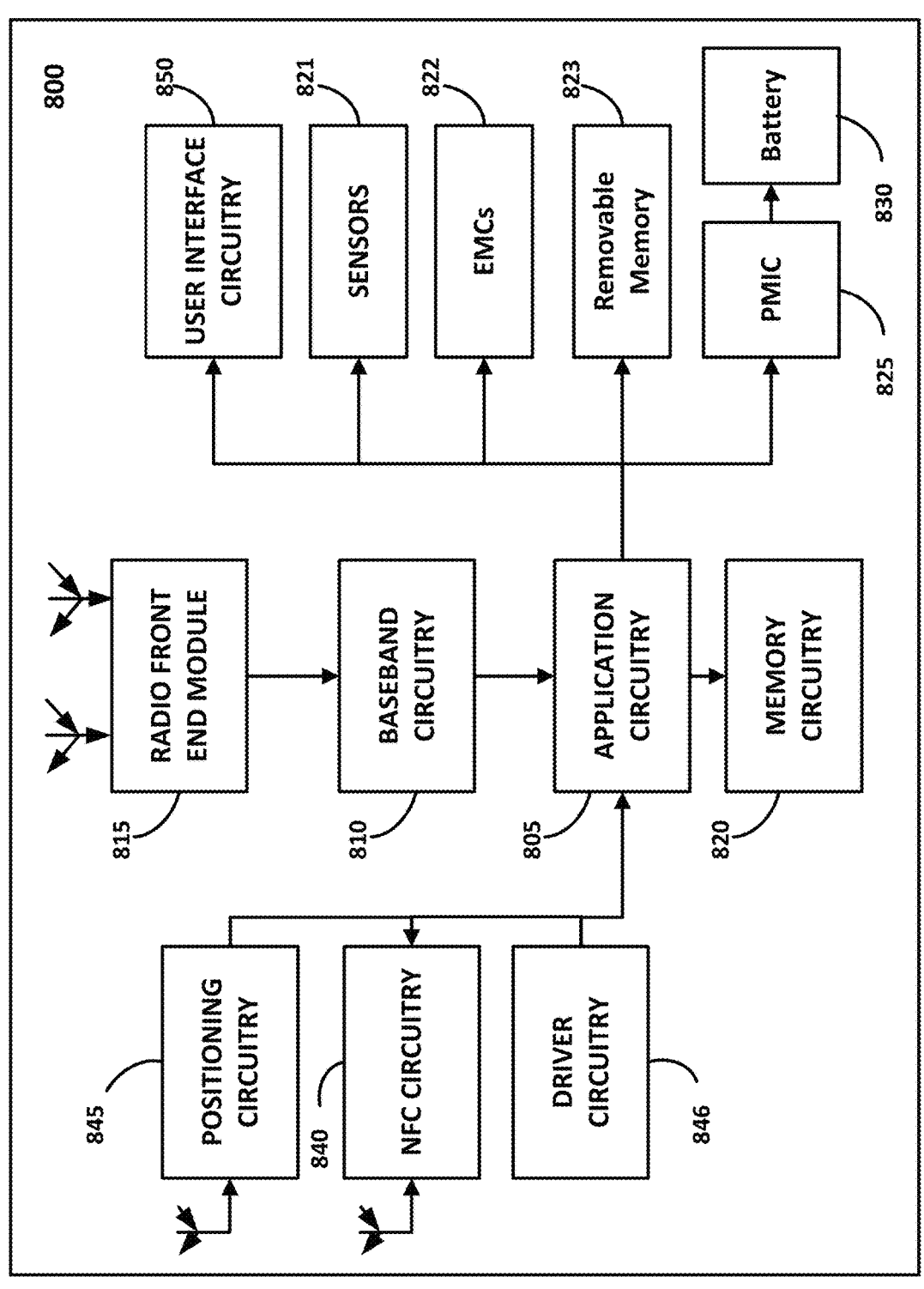
FIG. 8 depicts example components of a computer plat-form or device in accordance with various embodiments.

FIG. 8 illustrates an example of a platform 800 (or "device 800") in accordance with various embodiments. In embodiments, the computer platform 800 may be suitable for use as UEs 401, 501, 601, application servers 430, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 705 may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation. Santa Clara, CA. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s): a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A. Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc, in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to Figure XT.

The RFEMs 815 may comprise a millimeter wave (mm-Wave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, XD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signalling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS. Russia's GLONASS, the European Union's Galileo system. China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry 710 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 401, 501, 601.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery." which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block XS30 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD). LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA. EISA. PCI. PCIx. PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 9:
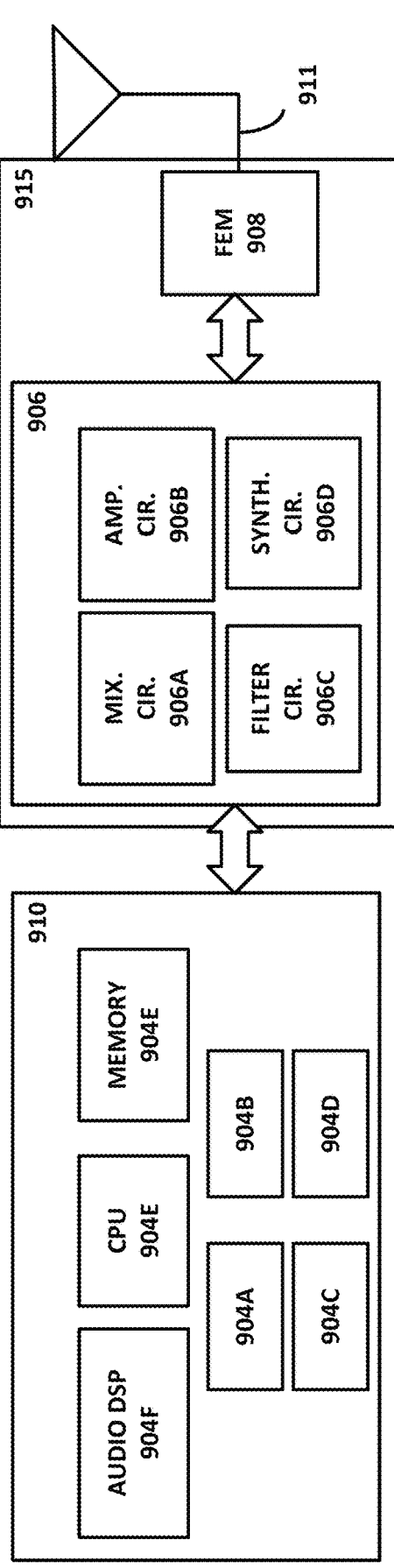
FIG. 9 depicts example components of baseband circuitry and radio frequency end modules in accordance with various embodiments.

FIG. 9 illustrates example components of baseband circuitry 910 and radio front end modules (RFEM) 915 in accordance with various embodiments. The baseband circuitry 910 corresponds to the baseband circuitry 710 and 810 of FIGS. 7 and 8, respectively. The RFEM 915 corresponds to the RFEM 715 and 815 of FIGS. 7 and 8, respectively. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Check encoder/decoder Parity (LDPC) functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 705/805 (see FIGS. 7 and 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 705/805 of FIGS. 7-9); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components. Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multiprotocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 705/805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 705/805 depending on the desired output frequency. In some embodiments, a divider control input (e.g., N) may be determined from a look-up table based on a channel indicated by the application circuitry 705/805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 705/805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 705/805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
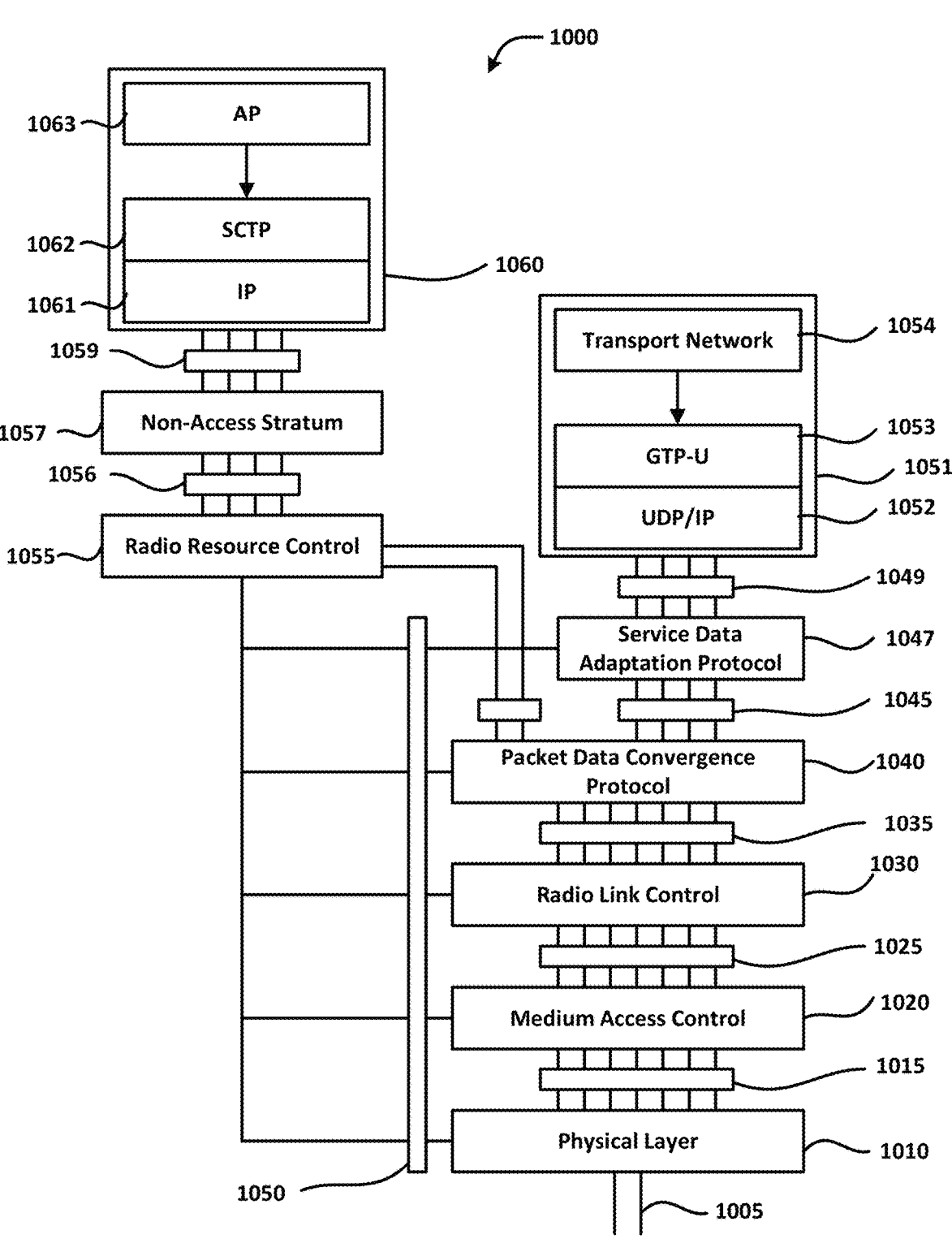
FIG. 10 illustrates various protocol functions that may be implemented in a wireless communication device according to various embodiments.

FIG. 10 illustrates various protocol functions that may be implemented in a wireless communication device according to various embodiments. In particular, FIG. 10 includes an arrangement 1000 showing interconnections between various protocol layers/entities. The following description of FIG. 10 is provided for various protocol layers/entities that operate in conjunction with the 5G/NR system standards and LTE system standards, but some or all of the aspects of FIG. 10 may be applicable to other wireless communication network systems as well.

The protocol layers of arrangement 1000 may include one or more of PHY 1010, MAC 1020, RLC 1030, PDCP 1040, SDAP 1047, RRC 1055, and NAS layer 1057, in addition to other higher layer functions not illustrated. The protocol layers may include one or more service access points (e.g., items 1059, 1056, 1050, 1049, 1045, 1035, 1025, and 1015 in FIG. 10) that may provide communication between two or more protocol layers.

The PHY 1010 may transmit and receive physical layer signals 1005 that may be received from or transmitted to one or more other communication devices. The physical layer signals 1005 may comprise one or more physical channels, such as those discussed herein. The PHY 1010 may further perform link adaptation or adaptive modulation and coding (AMC), power control, cell search (e.g., for initial synchronization and handover purposes), and other measurements used by higher layers, such as the RRC 1055. The PHY 1010 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1010 may process requests from and provide indications to an instance of MAC 1020 via one or more PHY-SAP 1015. According to some embodiments, requests and indications communicated via PHY-SAP 1015 may comprise one or more transport channels.

Instance(s) of MAC 1020 may process requests from, and provide indications to, an instance of RLC 1030 via one or more MAC-SAPs 1025. These requests and indications communicated via the MAC-SAP 1025 may comprise one or more logical channels. The MAC 1020 may perform mapping between the logical channels and transport channels, multiplexing of MAC SDUs from one or more logical channels onto TBs to be delivered to PHY 1010 via the transport channels, de-multiplexing MAC SDUs to one or more logical channels from TBs delivered from the PHY 1010 via transport channels, multiplexing MAC SDUs onto TBs, scheduling information reporting, error correction through HARQ, and logical channel prioritization.

Instance(s) of RLC 1030 may process requests from and provide indications to an instance of PDCP 1040 via one or more radio link control service access points (RLC-SAP) 1035. These requests and indications communicated via RLC-SAP 1035 may comprise one or more RLC channels.

The RLC 1030 may operate in a plurality of modes of operation, including: Transparent Mode (TM), Unacknowledged Mode (UM), and Acknowledged Mode (AM). The RLC 1030 may execute transfer of upper layer protocol data units (PDUs), error correction through automatic repeat request (ARQ) for AM data transfers, and concatenation, segmentation and reassembly of RLC SDUs for UM and AM data transfers. The RLC 1030 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1040 may process requests from and provide indications to instance(s) of RRC 1055 and/or instance(s) of SDAP 1047 via one or more packet data convergence protocol service access points (PDCP-SAP) 1045. These requests and indications communicated via PDCP-SAP 1045 may comprise one or more radio bearers. The PDCP 1040 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1047 may process requests from and provide indications to one or more higher layer protocol entities via one or more SDAP-SAP 1049. These requests and indications communicated via SDAP-SAP 1049 may comprise one or more QoS flows. The SDAP 1047 may map QoS flows to DRBs, and vice versa, and may also mark QFIs in DL and UL packets. A single SDAP entity 1047 may be configured for an individual PDU session. In the UL direction, the NG-RAN 410 may control the mapping of QoS Flows to DRB(s) in two different ways, reflective mapping or explicit mapping. For reflective mapping, the SDAP 1047 of a UE 401 may monitor the QFIs of the DL packets for each DRB, and may apply the same mapping for packets flowing in the UL direction. For a DRB, the SDAP 1047 of the UE 401 may map the UL packets belonging to the QoS flows(s) corresponding to the QoS flow ID(s) and PDU session observed in the DL packets for that DRB. To enable reflective mapping, the NG-RAN 610 may mark DL packets over the Uu interface with a QoS flow ID. The explicit mapping may involve the RRC 1055 configuring the SDAP 1047 with an explicit QoS flow to DRB mapping rule, which may be stored and followed by the SDAP 1047. In embodiments, the SDAP 1047 may only be used in NR implementations and may not be used in LTE implementations.

The RRC 1055 may configure, via one or more management service access points (M-SAP), aspects of one or more protocol layers, which may include one or more instances of PHY 1010, MAC 1020. RLC 1030, PDCP 1040 and SDAP 1047. In embodiments, an instance of RRC 1055 may process requests from and provide indications to one or more NAS entities 1057 via one or more RRC-SAPs 1056. The main services and functions of the RRC 1055 may include broadcast of system information (e.g., included in MIBs or SIBs related to the NAS), broadcast of system information related to the access stratum (AS), paging, establishment, maintenance and release of an RRC connection between the UE 401 and RAN 410 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1057 may form the highest stratum of the control plane between the UE 401 and the AMF 621. The NAS 1057 may support the mobility of the UEs 401 and the session management procedures to establish and maintain IP connectivity between the UE 401 and a P-GW in LTE systems.

According to various embodiments, one or more protocol entities of arrangement 1000 may be implemented in UEs 401, RAN nodes 411, AMF 621 in NR implementations or MME 521 in LTE implementations, UPF 602 in NR implementations or S-GW 522 and P-GW 523 in LTE implementations, or the like to be used for control plane or user plane communications protocol stack between the aforementioned devices. In such embodiments, one or more protocol entities that may be implemented in one or more of UE 401, gNB 411, AMF 621, etc. may communicate with a respective peer protocol entity that may be implemented in or on another device using the services of respective lower layer protocol entities to perform such communication. In some embodiments, a gNB-CU of the gNB 411 may host the RRC 1055, SDAP 1047, and PDCP 1040 of the gNB that controls the operation of one or more gNB-DUs, and the gNB-DUs of the gNB 411 may each host the RLC 1030, MAC 1020, and PHY 1010 of the gNB 411.

In a first example, a control plane protocol stack may comprise, in order from highest layer to lowest layer, NAS 1057, RRC 1055, PDCP 1040, RLC 1030, MAC 1020, and PHY 1010. In this example, upper layers 1060 may be built on top of the NAS 1057, which includes an IP layer 1061, an SCTP 1062, and an application layer signaling protocol (AP) 1063.

In NR implementations, the AP 1063 may be an NG application protocol layer (NGAP or NG-AP) 1063 for the NG interface 413 defined between the NG-RAN node 411 and the AMF 621, or the AP 1063 may be an Xn application protocol layer (XnAP or Xn-AP) 1063 for the Xn interface 412 that is defined between two or more RAN nodes 411.

The NG-AP 1063 may support the functions of the NG interface 413 and may comprise Elementary Procedures (EPS). An NG-AP EP may be a unit of interaction between the NG-RAN node 411 and the AMF 621. The NG-AP 1063 services may comprise two groups: UE-associated services (e.g., services related to a UE 401) and non-UE-associated services (e.g., services related to the whole NG interface instance between the NG-RAN node 411 and AMF 621). These services may include functions including, but not limited to: a paging function for the sending of paging requests to NG-RAN nodes 411 involved in a particular paging area; a UE context management function for allowing the AMF 621 to establish, modify, and/or release a UE context in the AMF 621 and the NG-RAN node 411; a mobility function for UEs 401 in ECM-CONNECTED mode for intra-system HOs to support mobility within NG-RAN and inter-system HOs to support mobility from/to EPS systems; a NAS Signaling Transport function for transporting or rerouting NAS messages between UE 401 and AMF 621; a NAS node selection function for determining an association between the AMF 621 and the UE 401; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 411 via CN 420; and/or other like functions.

The XnAP 1063 may support the functions of the Xn interface 412 and may comprise XnAP basic mobility procedures and XnAP global procedures. The XnAP basic mobility procedures may comprise procedures used to handle UE mobility within the NG RAN 411 (or E-UTRAN 510), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 401, such as Xn interface setup and reset procedures, NG-RAN update procedures, cell activation procedures, and the like.

In LTE implementations, the AP 1063 may be an S1 Application Protocol layer (S1-AP) 1063 for the S1 interface 413 defined between an E-UTRAN node 411 and an MME, or the AP 1063 may be an X2 application protocol layer (X2AP or X2-AP) 1063 for the X2 interface 412 that is defined between two or more E-UTRAN nodes 411.

The S1 Application Protocol layer (S1-AP) 1063 may support the functions of the S1 interface, and similar to the NG-AP discussed previously, the S1-AP may comprise S1-AP EPs. An S1-AP EP may be a unit of interaction between the E-UTRAN node 411 and an MME 521 within an LTE CN 420. The S1-AP 1063 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1063 may support the functions of the X2 interface 412 and may comprise X2AP basic mobility procedures and X2AP global procedures. The X2AP basic mobility procedures may comprise procedures used to handle UE mobility within the E-UTRAN 420, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 401, such as X2 interface setup and reset procedures, load indication procedures, error indication procedures, cell activation procedures, and the like.

The SCTP layer (alternatively referred to as the SCTP/IP layer) 1062 may provide guaranteed delivery of application layer messages (e.g., NGAP or XnAP messages in NR implementations, or S1-AP or X2AP messages in LTE implementations). The SCTP 1062 may ensure reliable delivery of signaling messages between the RAN node 411 and the AMF 621/MME 521 based, in part, on the IP protocol, supported by the IP 1061. The Internet Protocol layer (IP) 1061 may be used to perform packet addressing and routing functionality. In some implementations the IP layer 1061 may use point-to-point transmission to deliver and convey PDUs. In this regard, the RAN node 411 may comprise L2 and L1 layer communication links (e.g., wired or wireless) with the MME/AMF to exchange information.

In a second example, a user plane protocol stack may comprise, in order from highest layer to lowest layer, SDAP 1047, PDCP 1040, RLC 1030, MAC 1020, and PHY 1010. The user plane protocol stack may be used for communication between the UE 401, the RAN node 411, and UPF 602 in NR implementations or an S-GW 522 and P-GW 523 in LTE implementations. In this example, upper layers 1051 may be built on top of the SDAP 1047, and may include a user datagram protocol (UDP) and IP security layer (UDP/IP) 1052, a General Packet Radio Service (GPRS) Tunneling Protocol for the user plane layer (GTP-U) 1053, and a User Plane PDU layer (UP PDU) 1063.

The transport network layer 1054 (also referred to as a "transport layer") may be built on IP transport, and the GTP-U 1053 may be used on top of the UDP/IP layer 1052 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1053 may be used for carrying user data within the GPRS core network and between the radio access network and the core network. The user data transported can be packets in any of IPv4, IPv6, or PPP formats, for example. The UDP/IP 1052 may provide checksums for data integrity, port numbers for addressing different functions at the source and destination, and encryption and authentication on the selected data flows. The RAN node 411 and the S-GW 522 may utilize an S1-U interface to exchange user plane data via a protocol stack comprising an L1 layer (e.g., PHY 1010), an L2 layer (e.g., MAC 1020, RLC 1030, PDCP 1040, and/or SDAP 1047), the UDP/IP layer 1052, and the GTP-U 1053. The S-GW 522 and the P-GW 523 may utilize an S5/S8a interface to exchange user plane data via a protocol stack comprising an L1 layer, an L2 layer, the UDP/IP layer 1052, and the GTP-U 1053. As discussed previously, NAS protocols may support the mobility of the UE 401 and the session management procedures to establish and maintain IP connectivity between the UE 401 and the P-GW 523.

Moreover, although not shown by FIG. 10, an application layer may be present above the AP 1063 and/or the transport network layer 1054. The application layer may be a layer in which a user of the UE 401, RAN node 411, or other network element interacts with software applications being executed, for example, by application circuitry 705 or application circuitry 805, respectively. The application layer may also provide one or more interfaces for software applications to interact with communications systems of the UE 401 or RAN node 411, such as the baseband circuitry 910. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 11:
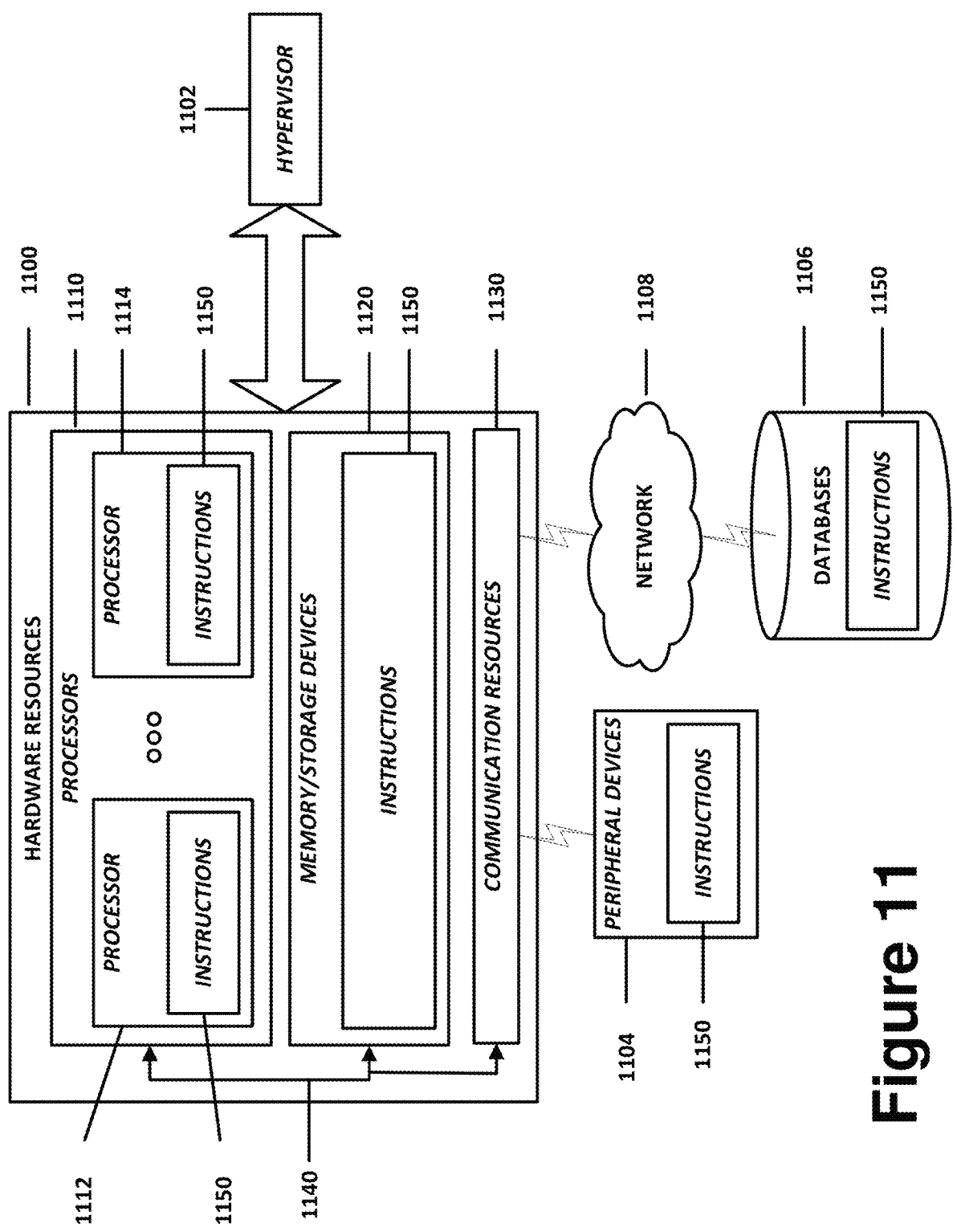
FIG. 11 is a block diagram illustrating components, according to some example embodiments, able to read instructions from a machine-readable or computer-readable medium (for example, a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method of sidelink communication between nodes comprising: resource selection; congestion control; and resource signaling.

Example 2 includes the method of example 1 and/or some other example(s) herein, wherein different UEs may select resources for transmissions of different priorities and indicate them in sidelink control information (SCI).

Example 3 includes the method of example 2 and/or some other example(s) herein, wherein priority field in SCI may be used as a resource preemption indicator.

Example 4 includes the method of example 2 and/or some other example(s) herein, wherein separate field specified in SCI to indicate whether specified resources were preempted by high priority UE and other UEs should yield overlapped resources.

Example 5 includes the method of example 2 and/or some other example(s) herein, wherein UE select resources for certain set of priorities considered as high priorities.

Example 6 includes the method of example 5 and/or some other example(s) herein, wherein UE transmit standalone signal which indicates the list of resources reserved for transmission of given priority.

Example 7 includes the method of example 6 and/or some other example(s) herein, wherein standalone signal may be transmitted using PSCCH channel.

Example 8 includes the method of example 5 and/or some other example(s) herein, wherein UE apply power boosting at the PRBs allocated for PSCCH transmission.

Example 9 includes the method of example 8 and/or some other example(s) herein, wherein the maximum number of PSCCH transmissions that may be boosted can be preconfigured by higher layers or may depends on assigned priority.

Example 10 includes the method of example 8 and/or some other example(s) herein, wherein the PSCCH resources boosting value may be a preconfigured value or may depend on priority assigned to transmission.

Example 11 includes the method of example 2 and/or some other example(s) herein, wherein UE select resources for certain set of priorities considered as low priorities and monitor medium for other nodes transmission.

Example 12 includes the method of example 11 and/or some other example(s) herein, wherein UE yield resources reserved or selected for own transmissions and trigger resource reselection procedure if their resources overlap with preempted resources.

Example 13 includes the method of example 12 and/or some other example(s) herein, wherein time instances to trigger resource reselections may be randomized in a predefined time window.

Example 14 includes the method of example 12 and/or some other example(s) herein, wherein overlap is detected by low priority UE if low and high priority UEs transmissions overlap in both time and frequency dimensions.

Example 15 includes the method of example 14 and/or some other example(s) herein, wherein low priority UE may select resource in the same time resource as used by high priority transmission if one or multiple conditions are satisfied: low priority UE already receive high priority transmission; RSRP measured at the resources occupied by high transmission UE is above certain preconfigured threshold; and/or distance to the transmitting high priority UE is below a certain preconfigured threshold.

Example 16 includes the method of example 12 and/or some other example(s) herein, wherein overlap is detected by low priority UE if low and high priority UEs overlap in time dimension.

Example 17 includes the method of example 12 and/or some other example(s) herein, wherein low priority UE may use different methods to detect high priority resource overlap simultaneously.

Example 18 includes the method of example 17 and/or some other example(s) herein, wherein time-frequency resource overlap detection method is used for one group of priorities PG1, while time resource overlap detection method is used for PG2, where priorities in PG2 higher than priorities in PG1.

Example 19 includes the method of example 17 and/or some other example(s) herein wherein time-frequency resource overlap detection method is determined by low priority UE based on information about difference between own transmission priority and higher transmission priority.

Example 20 includes the method of example 1 and/or some other example(s) herein, wherein resource yielding procedure may be performed at UE if it detects reservations from useful unicast or groupcast transmission.

Example 21 includes the method of example 20 and/or some other example(s) herein, wherein UE yield overlapped time-frequency resources or time-resources.

Example 22 includes the method of example 1 and/or some other example(s) herein, wherein channel occupancy ratio (CR) parameter is introduced to characterize transmitter node channel occupancy.

Example 23 includes the method of example 22 and/or some other example(s) herein, wherein CR parameter is estimated over the set of time-frequency resources called CR estimation window.

Example 24 includes the method of example 23 and/or some other example(s) herein, wherein CR calculation window used for aperiodic traffic CR evaluation includes only resources in time preceding the moment of CR evaluation, w/o projection to future time instances.

Example 25 includes the method of example 23 and/or some other example(s) herein, wherein joint CR metric is calculated for periodic and aperiodic traffic of the same priority.

Example 26 includes the method of example 23 and/or some other example(s) herein, wherein CR metric separately calculated for periodic and aperiodic traffics of the same priority.

Example 27 includes the method of example 23 and/or some other example(s) herein, wherein separate CR limit values (CRLimit_Periodic and CRLimit_Aperiodic) are calculated for periodic and aperiodic traffics of the same priority.

Example 28 includes the method of example 1 and/or some other example(s) herein, wherein metric that characterize amount of allocated resources (ARR) is calculated for each type of the traffic of specific priority.

Example 29 includes the method of examples 27 and/or 28, and/or some other example(s) herein, separate CR limit values (CRLimit_Periodic and CRLimit_Aperiodic) for packets of specific priority levels are calculated using the following equation: CRLimit_Periodic+ CRLimit_Aperiodic=CRLimit, where CRLimit_Periodic/ CRLimit_Aperiodic=k*(ARRPeriodic/ARRAperiodic), wherein k is a scaling factor (real number), k>0.

Example 30(a) includes the method of example 1 and/or some other example(s) herein, wherein if a UE is configured with high layer parameter cr-Limit and transmits PSSCH in slot n, the UE shall ensure the following limits for any priority value k:

$$\sum_{i\geq k} CR(i) \leq CR_{Limit}(k),$$

wherein CR(i) is the CR evaluated in slot n-Tproc for the PSSCH transmissions with priority set to i, and $CR_{Limit}(k)$ corresponds to the high layer parameter cr-Limit that is associated with the priority value k and the CBR range which includes the CBR measured in slot n-Tproc.

Example 30(b) includes the method of example 1 and/or some other example(s) herein, wherein CBR metric is defined as a measure of channel congestion level.

Example 31 includes the method of example 30(a) and/or 30(b) and/or some other example(s) herein, wherein CBR metric is evaluate over a set of time-frequency resources called CBR measurement window Example 32 includes the method of example 31 and/or some other example(s) herein, wherein CBR window is specified for the reference numerology with selected reference configuration Example 33 includes the method of example 32 and/or some other example(s) herein, wherein for numerology different from reference, CBR window length calculated using reference CBR window size with applied scaling factor Example 34 includes the method of example 31 and/or some other example(s) herein, wherein CBR window size is defined in a way that the number of measurement resources is the same as allocated in reference CBR window Example 35 includes the method of example 31 and/or some other example(s) herein, wherein PSFCH resources are excluded from CBR measurement resources Example 36 includes the method of example 1 and/or some other example(s) herein, wherein resource selection procedure use congestion control metrics (e.g., CBR and/or CR)

Example 37 includes the method of example 36 and/or some other example(s) herein, wherein resource (re)selection is triggered if CBR metric exceeds predefined threshold Example 38 includes the method of example 36 and/or some other example(s) herein, wherein scheduling window is a function of CBR. The larger the CBR, the larger the scheduling window size.

Example 39 includes the method of example 36 and/or some other example(s) herein, wherein selection window is a function of CBR. Larger scheduling window corresponds to the larger CBR metric.

Example 40 includes the method of example 36 and/or some other example(s) herein, wherein the number of earliest in time resources is a function of CBR.

Example 41 includes the method of example 1 and/or some other example(s) herein, wherein time offset T1 where resource selection window starts depends on transmission priority. The higher priority, that closer resource selection window start time to the resource (re-)selection trigger Example Z01 may include an apparatus comprising means to perform one or more elements of a method described in or related to any of examples 1-41, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-41, or any other method or process described herein.

Example Z03 may include an apparatus comprising logic, modules, or circuitry to perform one or more elements of a method described in or related to any of examples 1-41, or any other method or process described herein.

Example Z04 may include a method, technique, or process as described in or related to any of examples 1-41, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-41, or portions thereof.

Example Z06 may include a signal as described in or related to any of examples 1-41, or portions or parts thereof.

Example Z07 may include a datagram, packet, frame, segment, protocol data unit (PDU), or message as described in or related to any of examples 1-41, or portions or parts thereof, or otherwise described in the present disclosure.

Example Z08 may include a signal encoded with data as described in or related to any of examples 1-41, or portions or parts thereof, or otherwise described in the present disclosure.

Example Z09 may include a signal encoded with a datagram, packet, frame, segment, protocol data unit (PDU), or message as described in or related to any of examples 1-41, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-41, or portions thereof.

Example Z11 may include a computer program comprising instructions, wherein execution of the program by a processing element is to cause the processing element to carry out the method, techniques, or process as described in or related to any of examples 1-41, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital Expenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit |
| gNB-DU | gNB-distributed unit |

-continued

| GNSS | Global Navigation Satellite System |
|---|---|
| GPRS | General Packet Radio Service |
| GSM | Global System for Mobile Communications, Groupe Special Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, e.g., port 443) |
| I-Block | Information Block |
| ICCID | Integrated Circuit Card Identification |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| K | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |

-continued

| LCR | Low Chip Rate |
|---|---|
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |

-continued

-continued

| | |
|---|---|
| NGEN-DC | NG-RAN E-UTRA-NR Dual Connectivity |
| NM | Network Manager |
| NMS | Network Management System |
| N-POP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | 'Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement, Performance Management |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |

| | |
|---|---|
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, |

57
-continued

| | |
|---|---|
| | Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SINR | signal-to-noise and interference ratio |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SNR | signal-to-noise ratio |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator |
| SSC | Session and Service Continuity |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |

58
-continued

| | |
|---|---|
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | Expected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof.

The term "device" refers to a physical entity embedded inside, or attached to, another physical entity in its vicinity, with capabilities to convey digital information from or to that physical entity.

The term "entity" refers to a distinct component of an architecture or device, or information transferred as a payload.

The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "admission control" refers to a validation process in communication systems where a check is performed before a connection is established to see if current resources are sufficient for the proposed connection.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell. When a UE in RRC_CONNECTED configured with CA/DC, the term "serving cell" refers to the set of cells comprising the Special Cell(s) and all secondary cells.

The term "Special Cell" refers to the PCell of the MCG or the PSCell of the SCG for DC operation; otherwise, the term "Special Cell" refers to the Pcell.

The invention claimed is:

1. An apparatus for use in a user equipment (UE), wherein the apparatus comprises:
   memory to store a priority level k that is related to a sidelink transmission that is to be transmitted in a slot n; and
   one or more processors configured to:
      identify, based on the priority level k, a channel occupancy ratio (CR) limit $CR_{Limit}(k)$;
      identify, based on respective CR values related to one or more transmissions with a priority level i that is greater than or equal to k, a cumulative CR value; and
      ensure that the cumulative CR value is less than or equal to $CR_{Limit}(k)$.

2. The apparatus of claim 1, wherein the cumulative CR value is a summation of the respective CR values related to the one or more transmissions with the priority level i.

3. The apparatus of claim 1, wherein the one or more transmissions with the priority level i are to be transmitted in a slot that is different than slot n.

4. The apparatus of claim 1, wherein the sidelink transmission is a physical sidelink shared channel (PSSCH) transmission.

5. The apparatus of claim 1, wherein the CR limit $CR_{Limit}(k)$ is further based on a channel busy ratio (CBR) metric.

6. The apparatus of claim 1, wherein the priority level k is identified by the UE based on a sidelink control information (SCI).

7. The apparatus of claim 1, wherein the one or more processors are configured to ensure that the cumulative CR value is less than the CR limit $CR_{Limit}(k)$ by dropping a transmission in the slot n.

8. One or more non-transitory computer-readable media (NTCRM) comprising instructions that, upon execution of the instructions by one or more processors of a user equipment (UE), are to cause the UE to:
   identify a priority level k that is related to a sidelink transmission that is to be transmitted in a slot n;
   identify, based on the priority level k, a channel occupancy ratio (CR) limit $CR_{Limit}(k)$;
   identify, based on respective CR values related to one or more transmissions with a priority level i that is greater than or equal to k, a cumulative CR value; and
   ensure that the cumulative CR value is less than or equal to $CR_{Limit}(k)$.

9. The one or more NTCRM of claim 8, wherein the cumulative CR value is a summation of the respective CR values related to the one or more transmissions with the priority level i.

10. The one or more NTCRM of claim 8, wherein the one or more transmissions with the priority level i are to be transmitted in a slot that is different than slot n.

11. The one or more NTCRM of claim 8, wherein the sidelink transmission is a physical sidelink shared channel (PSSCH) transmission.

12. The one or more NTCRM of claim 8, wherein the CR limit $CR_{Limit}(k)$ is further based on a channel busy ratio (CBR) metric.

13. The one or more NTCRM of claim 8, wherein the priority level k is identified by the UE based on a sidelink control information (SCI).

14. The one or more NTCRM of claim 8, wherein the instructions are further to cause the UE to ensure that the cumulative CR value is less than the CR limit $CR_{Limit}(k)$ by dropping a transmission in the slot n.

15. A user equipment (UE) comprising:

one or more processors; and one or more non-transitory computer-readable media comprising instructions that, upon execution of the instructions by the one or more processors, are to cause the UE to:

identify a priority level k that is related to a sidelink transmission that is to be transmitted in a slot n;

identify, based on the priority level k, a channel occupancy ratio (CR) limit $CR_{Limit}(k)$;

identify, based on respective CR values related to one or more transmissions with a priority level i that is greater than or equal to k, a cumulative CR value; and ensure that the cumulative CR value is less than or equal to $CR_{Limit}(k)$.

16. The UE of claim 15, wherein the cumulative CR value is a summation of the respective CR values related to the one or more transmissions with the priority level i.

17. The UE of claim 15, wherein the one or more transmissions with the priority level i are to be transmitted in a slot that is different than slot n.

18. The UE of claim 15, wherein the sidelink transmission is a physical sidelink shared channel (PSSCH) transmission.

19. The UE of claim 15, wherein the CR limit $CR_{Limit}(k)$ is further based on a channel busy ratio (CBR) metric.

20. The UE of claim 15, wherein the priority level k is identified by the UE based on a sidelink control information (SCI).

* * * * *